US012660962B1

(12) United States Patent
Truong

(10) Patent No.: US 12,660,962 B1
(45) Date of Patent: Jun. 23, 2026

(54) AUTOMATED ROBOTIC SYSTEM AND METHOD FOR PREPARATION OF FOOD ITEMS

(71) Applicant: Burger Bots Inc., San Jose, CA (US)

(72) Inventor: Elizabeth Truong, San Jose, CA (US)

(73) Assignee: Burger Bots Inc., San Jose, CA (US)

( * ) Notice: Subject to any disclaimer, the term of this patent is extended or adjusted under 35 U.S.C. 154(b) by 934 days.

(21) Appl. No.: 17/959,211

(22) Filed: Oct. 3, 2022

(51) Int. Cl.
*A47J 44/00* (2006.01)
*B25J 9/00* (2006.01)

(52) U.S. Cl.
CPC ............. *A47J 44/00* (2013.01); *B25J 9/0093* (2013.01)

(58) Field of Classification Search
CPC ................................ A47J 44/00; B25J 9/0093
See application file for complete search history.

(56) References Cited

U.S. PATENT DOCUMENTS

| | | | | |
|---|---|---|---|---|
| 5,113,754 | A | * | 5/1992 | Robinson ............. A47J 37/045 |
| | | | | 99/387 |
| 5,306,192 | A | * | 4/1994 | Caveza ............. A63H 33/3055 |
| | | | | 446/481 |
| 9,295,281 | B2 | | 3/2016 | Vardakostas |
| 9,295,282 | B2 | | 3/2016 | Vardakostas |
| 9,326,544 | B2 | | 5/2016 | Vardakostas |
| 10,067,109 | B2 | | 9/2018 | Frehn |
| 10,068,273 | B2 | | 9/2018 | Frehn |
| 10,219,535 | B2 | | 3/2019 | Vardakostas |
| 10,292,415 | B2 | | 5/2019 | Vardakostas |

| | | | |
|---|---|---|---|
| D858,599 | S | 9/2019 | Anderson |
| 10,676,220 | B2 | 6/2020 | Vardakostas |
| 10,743,552 | B2 | 8/2020 | Frehn |
| 10,743,710 | B2 | 8/2020 | Frehn |
| 10,839,438 | B2 | 11/2020 | Frehn |
| 10,875,720 | B2 | 12/2020 | Sherman |
| 10,905,150 | B2 | 2/2021 | Vardakostas |
| 10,928,373 | B2 | 2/2021 | Frehn |
| 11,023,949 | B2 | 6/2021 | Radcliffe |
| 2014/0324607 | A1 | 10/2014 | Frehn et al. |
| 2015/0053097 | A1 | 2/2015 | Vardakostas |
| 2015/0164131 | A1 | 6/2015 | Vardakostas |
| 2016/0213053 | A1 | 7/2016 | Frehn et al. |
| 2016/0213054 | A1 | 7/2016 | Frehn et al. |

(Continued)

FOREIGN PATENT DOCUMENTS

| | | | |
|---|---|---|---|
| WO | 2019246463 | A1 | 12/2019 |

OTHER PUBLICATIONS

Hyphen—Automated Restaurant Solutions for Optimized Food Production. (2024) http://usehyphen.com, 1 pg. website.

*Primary Examiner* — Woody A Lee, Jr.
(74) *Attorney, Agent, or Firm* — Patent Law Works LLP

(57) ABSTRACT

A system and methods for automated food preparation is disclosed. In some embodiments, the automated food preparation system comprises a multi-phase process and systematic system for sequentially performing preparation and assembly tasks that are synchronized in timing with tasks performed. The automated food preparation comprises robotic elements, sensor array, a synchronization program and mechanical structures configured to operate as activated according to the synchronization program. The automated food preparation system as illustrated is capable of performing a wide range of food preparation steps in a food preparation environment.

20 Claims, 14 Drawing Sheets

(56) References Cited

U.S. PATENT DOCUMENTS

| | | | |
|---|---|---|---|
| 2017/0024789 A1 | 1/2017 | Frehn | |
| 2017/0280763 A1 | 10/2017 | Nazarian | |
| 2017/0290345 A1 | 10/2017 | Garden et al. | |
| 2018/0310773 A1 | 11/2018 | Sekar et al. | |
| 2019/0080384 A1 | 3/2019 | Radcliffe | |
| 2019/0176338 A1 | 6/2019 | Zito | |
| 2019/0261671 A1 | 8/2019 | Vardakostas | |
| 2019/0275676 A1 | 9/2019 | Jensen | |
| 2019/0298104 A1 | 10/2019 | Balsamo | |
| 2019/0320846 A1* | 10/2019 | Nevarez | A47J 37/044 |
| 2019/0387921 A1 | 12/2019 | Lemberger | |
| 2020/0031008 A1 | 1/2020 | Engel-Hall | |
| 2020/0047349 A1 | 2/2020 | Sinnet | |
| 2020/0101469 A1 | 4/2020 | Brinkman | |
| 2020/0121125 A1 | 4/2020 | Zito | |
| 2020/0139554 A1 | 5/2020 | Sinnet | |
| 2020/0205461 A1 | 7/2020 | Cohen | |
| 2020/0249660 A1* | 8/2020 | Rao | A21B 1/42 |
| 2020/0269434 A1* | 8/2020 | Anderson | A47J 44/00 |
| 2020/0357220 A1* | 11/2020 | Gauger | B65B 25/001 |
| 2020/0397192 A1 | 12/2020 | Esparza | |
| 2021/0001500 A1 | 1/2021 | Anderson | |
| 2021/0022559 A1 | 1/2021 | Zito | |
| 2021/0103968 A1 | 4/2021 | Frehn | |
| 2021/0259296 A1 | 8/2021 | Vardakostas | |
| 2021/0259439 A1 | 8/2021 | Brinkman | |
| 2021/0260784 A1 | 8/2021 | Engel-Hall | |
| 2021/0267255 A1 | 9/2021 | Vardakostas | |
| 2021/0269186 A1 | 9/2021 | Goodman | |
| 2023/0039555 A1* | 2/2023 | Kim | A47J 37/08 |

* cited by examiner

NETWORK
317

BARCODE READERS
316

PROCESSOR
302

LOADING
MECHANISM
318

TIMER
304

TIMING SEQUENCER
320

MAIN MEMORY
306

ACTION TRIGGER
GENERATOR
322

NETWORK INTERFACE
308

SENSOR ARRAY
310

ACTION
CONTROLLER
324

USER INTERFACE
312

TRANSITION ENGINE
326

DATA STORAGE
313

EDGE ALIGNMENT
ENGINE
314

315

300

400

REGISTER TRAY NUMBER TO A POS LOCATION - ACTIVATE AUTOMATED
FOOD PREPARATION SEQUENCE AT POS AT INITIAL START TIME
402

SEQUENTIALLY LOAD TRAYS WITH BAR CODE ON CONVEYOR AT
DESIGNATED TIME INTERVALS CONTROLLED BY TIMING SEQUENCE
404

AT BARCODE STATION – BARCODE READER READS BAR CODE ON EACH
TRAY
406

UNLOCK TRAY AND RELEASE FROM POSITION TO ENABLE TRANSITION TO
NEXT PHASE/OPERATION
IN PROGRAMMED SEQUENCE
408

TRANSITION TO NEXT OPERATION AT A CUTTING STATION AFTER PRE-
DESIGNATED TIME PERIOD ELAPSES
410

ACTIVATE PARALLEL, LINEAR ACTUATORS AT CUTTING STATION, TO MOVE
AT HIGH SPEED AND PERFORM REPETITIVE SLICING TASKS QUICKLY AND
CONSISTENTLY OF DIFFERENT FOOD ITEMS REQUIRED FOR FOOD
PREPARATION OR ASSEMBLY
412

ADVANCE TIMING SEQUENCE TO INITIATE ASSOCIATED OPERATIONS – 1$^{ST}$
OPERATION SEQUENCE; 2$^{ND}$ OPERATION SEQUENCE UNTIL NTH
OPERATION SEQUENCE
414

FIG. 4A

A

800

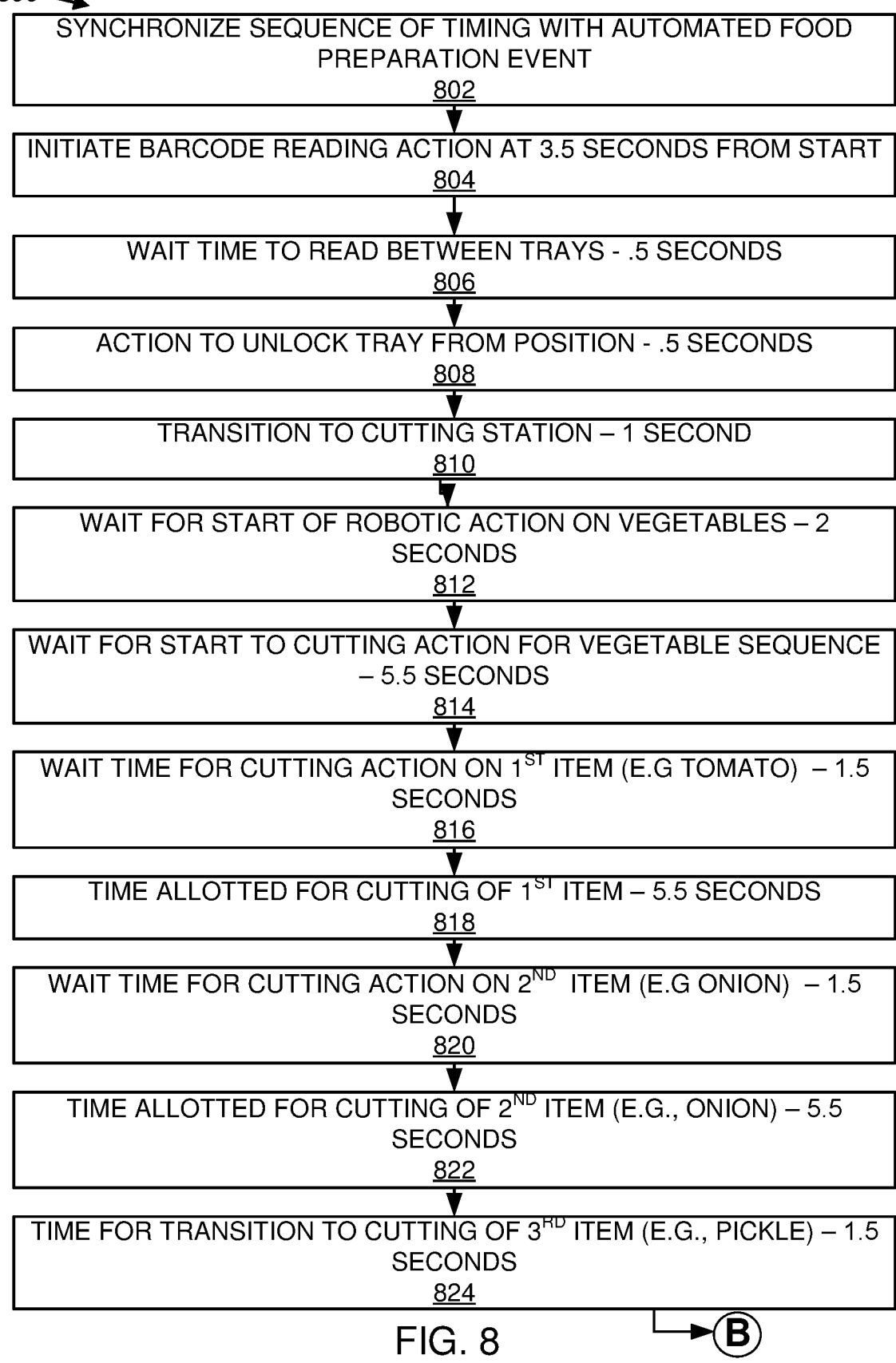

SYNCHRONIZE SEQUENCE OF TIMING WITH AUTOMATED FOOD PREPARATION EVENT
802

INITIATE BARCODE READING ACTION AT 3.5 SECONDS FROM START
804

WAIT TIME TO READ BETWEEN TRAYS - .5 SECONDS
806

ACTION TO UNLOCK TRAY FROM POSITION - .5 SECONDS
808

TRANSITION TO CUTTING STATION – 1 SECOND
810

WAIT FOR START OF ROBOTIC ACTION ON VEGETABLES – 2 SECONDS
812

WAIT FOR START TO CUTTING ACTION FOR VEGETABLE SEQUENCE – 5.5 SECONDS
814

WAIT TIME FOR CUTTING ACTION ON 1$^{ST}$ ITEM (E.G TOMATO) – 1.5 SECONDS
816

TIME ALLOTTED FOR CUTTING OF 1$^{ST}$ ITEM – 5.5 SECONDS
818

WAIT TIME FOR CUTTING ACTION ON 2$^{ND}$ ITEM (E.G ONION) – 1.5 SECONDS
820

TIME ALLOTTED FOR CUTTING OF 2$^{ND}$ ITEM (E.G., ONION) – 5.5 SECONDS
822

TIME FOR TRANSITION TO CUTTING OF 3$^{RD}$ ITEM (E.G., PICKLE) – 1.5 SECONDS
824

FIG. 8          B

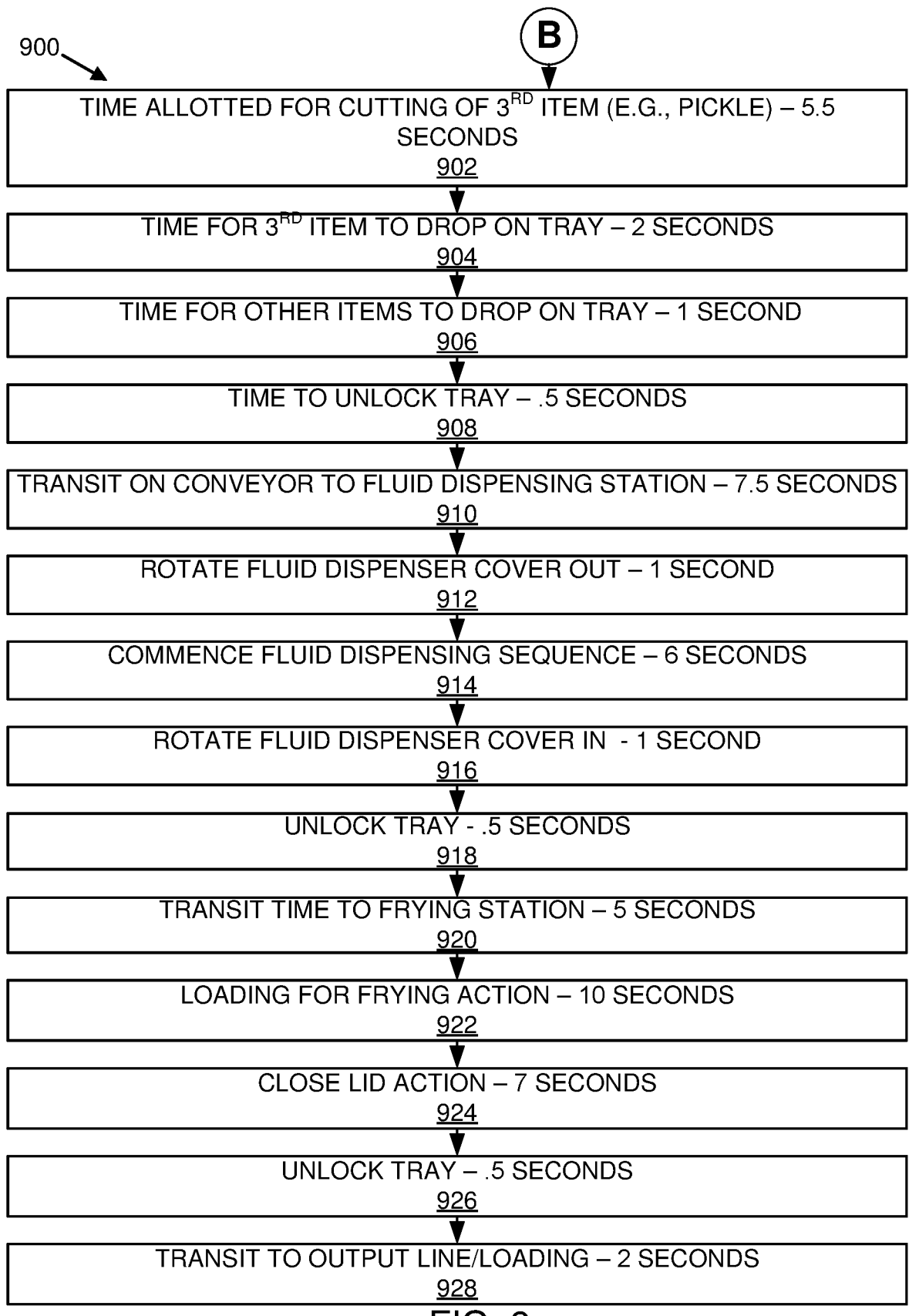

900

B

TIME ALLOTTED FOR CUTTING OF 3<sup>RD</sup> ITEM (E.G., PICKLE) – 5.5 SECONDS
902

TIME FOR 3<sup>RD</sup> ITEM TO DROP ON TRAY – 2 SECONDS
904

TIME FOR OTHER ITEMS TO DROP ON TRAY – 1 SECOND
906

TIME TO UNLOCK TRAY – .5 SECONDS
908

TRANSIT ON CONVEYOR TO FLUID DISPENSING STATION – 7.5 SECONDS
910

ROTATE FLUID DISPENSER COVER OUT – 1 SECOND
912

COMMENCE FLUID DISPENSING SEQUENCE – 6 SECONDS
914

ROTATE FLUID DISPENSER COVER IN - 1 SECOND
916

UNLOCK TRAY - .5 SECONDS
918

TRANSIT TIME TO FRYING STATION – 5 SECONDS
920

LOADING FOR FRYING ACTION – 10 SECONDS
922

CLOSE LID ACTION – 7 SECONDS
924

UNLOCK TRAY – .5 SECONDS
926

TRANSIT TO OUTPUT LINE/LOADING – 2 SECONDS
928

FIG. 9

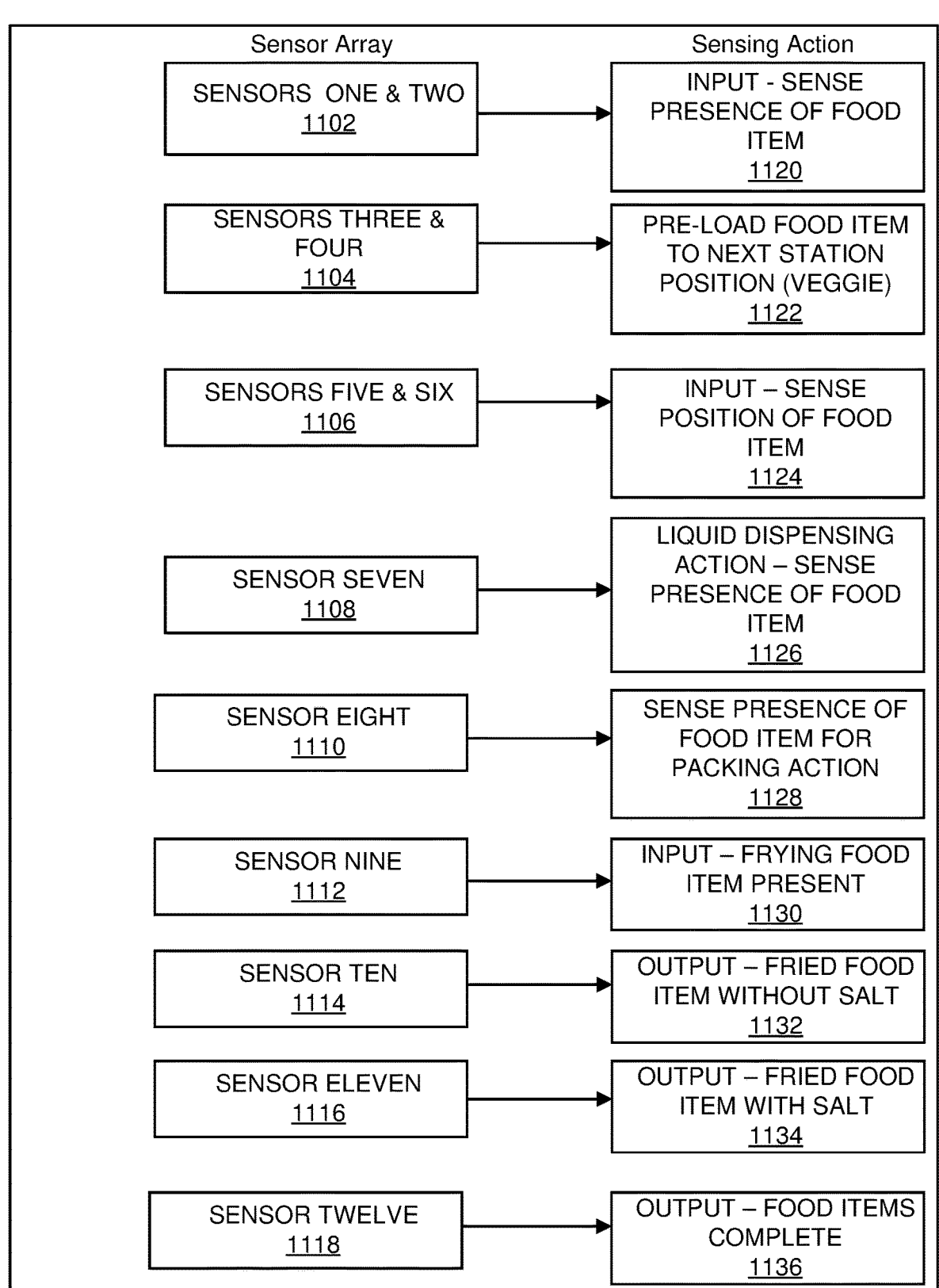

| Sensor Array | Sensing Action |
|---|---|
| SENSORS ONE & TWO 1102 | INPUT - SENSE PRESENCE OF FOOD ITEM 1120 |
| SENSORS THREE & FOUR 1104 | PRE-LOAD FOOD ITEM TO NEXT STATION POSITION (VEGGIE) 1122 |
| SENSORS FIVE & SIX 1106 | INPUT – SENSE POSITION OF FOOD ITEM 1124 |
| SENSOR SEVEN 1108 | LIQUID DISPENSING ACTION – SENSE PRESENCE OF FOOD ITEM 1126 |
| SENSOR EIGHT 1110 | SENSE PRESENCE OF FOOD ITEM FOR PACKING ACTION 1128 |
| SENSOR NINE 1112 | INPUT – FRYING FOOD ITEM PRESENT 1130 |
| SENSOR TEN 1114 | OUTPUT – FRIED FOOD ITEM WITHOUT SALT 1132 |
| SENSOR ELEVEN 1116 | OUTPUT – FRIED FOOD ITEM WITH SALT 1134 |
| SENSOR TWELVE 1118 | OUTPUT – FOOD ITEMS COMPLETE 1136 |

FIG. 11

AUTOMATED ROBOTIC SYSTEM AND METHOD FOR PREPARATION OF FOOD ITEMS

BACKGROUND

1. Field of the Invention

The present invention relates to use of automation and robotics to expedite food preparation with care and precision, for example, in a commercial facility, such as a kitchen, restaurant, or the like. More particularly, the present invention relates to automated or robotic kitchen appliances capable of performing a wide range of food preparation steps in a food preparation environment and systems and processes for synchronized collaboration of such kitchen appliances.

2. Description of the Related Art

Recent trends in the food industry are moving in the direction of automating food preparation in many ways. One of the most significant reasons for this increased interest in automating the food industry is its cost structure. Food processing and service is labor-intensive, with labor costs amounting up to fifty percent of the product or service cost. Improving productivity and reducing labor costs therefore, significantly impacts profitability.

Much of the manual work in food processing and service requires rapid, repetitive, and monotonous movement. Consequently, low levels of motivation are common in the workers. This often leads to poor quality control and a high incidence of accidents in the kitchen. Automating repetitive tasks improves quality control, efficiency, and reduces the high level of careless accidents.

One of the most important obstacles in the automation of food manufacturing is the biological variation in size, shape, and homogeneity of the raw materials. Typically, certain materials, for example, dairy, are easily processed by automation because the raw material, for example, milk can be handled in bulk. The dairy industry is among the most automated. Yet, materials such as fruits, vegetables, meat, etc., require handling on a more individual unit basis. This has hindered automation. Not surprising, but the food industry requires a level of flexibility in automation uncommon to other mature industries. For example, materials that are not well defined in size or shape are often presented in a random, unconstrained orientation. They must often be handled carefully to prevent damage and thus challenge the capabilities of existing technology.

Furthermore, consistency is crucial in the food business. Consumers like to buy the same product over and over again and expect the same consistency in terms of flavor, taste, and texture. Automation can deliver this consistency by eliminating instances of human error and effectively managing production, which in turn reduces the risk of unhappy customers and ultimately protects a seller's brand.

Automation eliminates the need for workers to perform monotonous and repetitive motion tasks. Increased safety for workers also assists with reducing operation or maintenance costs in the long run. Moreover, automation facilitates faster adoption and quicker updates to existing hardware and software to meet compliance standards. Automation also improves end-to-end traceability, which is absolutely critical in the food businesses, when consumer illnesses are reported and must be tracked. Automation and modern analytics tools can track products and goods throughout the supply chain journey, providing a business owner visibility, anywhere along the chain, to view the information relevant for a particular purpose or view into key processes. For example, automation tools may be used to find a contaminated order and pinpoint where it's been heading. In this way, a business owner may isolate issues before they escalate and impact the wider public. Automation is critical to protecting a business owner's brand value.

Furthermore, with automation, a business owner may reap the rewards of increased efficiency and higher output rates, largely because technology is able to work all day and night, with an occasional break for maintenance. Automation also allows a food business owner to gather data insights from the production line that may be used to improve maintenance. For example, a smart business using IoT (Internet of Things) enabled devices is equipped to automatically collect data on the performance of each appliance it uses and transfer it straight into an enterprise resource planning ("ERP") system. This access to real-time data helps identify potential issues more quickly and may alert a business operator when maintenance is needed.

In particular, in the food and drinks service industry, there is increasing pressure from vigilant consumers who demand to know about practices followed by a business before they purchase food products. For example, consumers inquire about the origin and journey a food product takes before it arrives on in the consumer's hands. Therefore, to maintain the consumer's trust, a food business must follow best practices. Any food product recalls or disease outbreaks are damaging to business reputation and profits.

An integrated food business system can advantageously ensure that its practices abide by regulations and that it can provide visibility for regulations. In addition, automation can help food businesses improve their supply and demand management. Tracking accurate data on consumption and inventory is more effective. Automation helps to improve productivity and product quality. Both of these contribute directly to improved profitability and compliance with food safety and environmental regulatory agencies.

Providing a robust and effective apparatus or combination of apparatuses configured to prepare food for consumers, although desirable, is challenging because of the wide variety of types of food, cooking techniques, kitchen appliances, kitchen tools, and utensils that are typically used. Various types of existing, commercial food preparation equipment address some of these challenges. The existing equipment, however, has several drawbacks. First, available food preparation equipment is usually designed as a bespoke solution to perform a limited scope of work. Chaining together many different pieces into a workflow is a complex and expensive process and results in a system with highly limited capabilities and a large footprint. Second, such food preparation equipment typically requires batch preparation of food items. For example, there exist clamshell grills, which are typically designed to prepare multiple food items in batches and are not useful for preparing items individually. Third, the increased mechanical and/or electrical complexity inherent in such devices often leads to increased failure rates versus conventional, non-automated versions of such devices, resulting in higher downtimes. Such downtimes are especially costly for restaurants because restaurants do not typically have back-up equipment onsite and consequently, they may not be able to cook a number of items on their menu, which reduces average order size invokes customer ire. Fourth, such food preparation equipment typically has a large footprint compared to conventional versions of the equipment. This larger size is a challenge for restaurant owners because of the high cost of kitchen space. Fifth, the potential benefits of such food preparation equipment are often outweighed by their associated upfront costs that must be incurred. For example, automated frying equipment is significantly more expensive than conventional frying equipment. Sixth, such food preparation equipment still requires extensive involvement of kitchen workers. Seventh, most food preparation equipment does not interact with outside data to achieve optimal production scheduling and reduce food wasted. Because of the above-noted challenges, use of automation in restaurant and food service operations is generally limited to spot solutions and does not take advantage of the availability of data to build accurate demand models and then use these models to automatically feed a production or preparation schedule.

Moreover, there are challenges associated with packaging of raw food. In order for a robotic kitchen assistant to provide maximum value to an end customer, it must effectively batch kitchen worker interaction time. One point where batching is required is for the input of workload to the kitchen assistant. In addition, there are challenges associated with equipment temperature integration with robots. For example, most kitchen equipment that uses heat to cook have an integrated thermal control system to set and hold the desired temperature profile. This temperature profile is difficult to maintain accurately, in the instance of a thermal disturbance, for example, when a batch of frozen fries is introduced. Faster cooking and improved quality of a product may be achieved by tracking this thermal profile more accurately.

In addition, there are challenges associated with the utensils used for frying food items. Frying baskets are used to contain food during the cooking process in a fryer, enabling easy extraction from the fryer. An alternative approach is termed "open-bay" cooking, whereby food is tossed in the fryer and then shoveled out. Baskets are traditionally made from wire or sheet metal with silicone handles to provide thermal insulation for a kitchen worker grabbing the basket.

In addition, there are challenges associated with packaging and plating the cooked food items. Designing an apparatus that is robust for packing or plating a variety of foods, using a variety of containers, while simultaneously measuring and counting, is challenging due to the wide variety of food types in many shapes and forms as well as the variety of plates and containers available. Various commercial equipment addresses some of these challenges. One example of equipment for portioning food is a scale, which weighs and releases a fixed amount of food repeatedly. Packing and plating food is commonly done by food service workers in commercial kitchens in order to ease distribution to end consumers. The task of packing takes several forms and involves arranging food items as well as other items, sometimes in a specific pattern, within a container, package, or on a plate. The packing task may involve sorting through several types of food items and portioning one or more types of food. It should be recognized by those skilled in the art that portioning means to pack or plate a specific amount of food as measured by weight, volume, or quantity, or some combination of these metrics. In most kitchens, measurements may be accomplished with measuring tools such as measuring cups or spoons for volume or a scale for weight. In practice, many kitchen workers choose to approximate portioning in lieu of testing. This can cause concerns for end consumers and impact profits for food service operators.

Automation exists for packing systems but such systems are generally large and expensive to design and are built in a way that makes them impractical for many food service operations such as restaurants and cooking commissaries. Moreover, these devices are often large and dedicated to a single food item, which would require multiple custom devices to package complex meals. The mechanical complexity of these devices can lead to high failure rate on equipment. This downtime can be costly to restaurants or food service operators. These automation solutions are typically set up as factory lines and are specifically tooled to packing specific items into specific packing containers. The costs of existing systems are high since so much time must go into designing, constructing, and deploying the solution. Minor variations in the output may require costly reconfiguration. Also, these types of systems either run constantly, or require assistance from a kitchen worker, instead of providing on demand packing. These types of systems are not easily portable.

In automation, robotics is increasingly used in the food and beverage industry. The two most common applications for food-handling robots currently are packaging and palletizing. Food robots are used for primary packaging, the stage in the line, during which food is packed into its wrapper, container, or vacuum-sealed bag. Secondary packaging is another common application in which robots are used. Palletizing represents an additional large market use for robotics for food and beverage processing. New classes of robotics systems with improved capabilities to manipulate less-rigid objects with greater variability in size, shape, and orientation are expanding adoption of robotics in these two areas. For example, machine vision is combined with robotics to improve cheese packaging line automation and reliability. In such applications, the vision-guided system identifies and locates the centers of the individually packaged products. Each robot utilizes this information along with the conveyor encoder to line-track and pick products in motion.

In yet another example where robotics is increasingly used is meat processing, which involves many operations for which humans are not ideally suited. In this area, robotics is widely used for cutting, sorting, and packaging. Working in freezers and refrigerated cold boxes is not conducive to human comfort, but robots can work continuously in those conditions without interruption. In addition, cutting and trimming carcasses is dangerous work for humans, yet robots can work precisely and repeatedly without risk. Another advantage of using robots is these scenarios is that humans can potentially taint foods with pathogens and/or bacteria from illnesses, whereas robots can be highly sanitized and are never ill. Modern meat processing robots can automatically eviscerate 360 carcasses per hour. They are also used for processing sausages and deboning and cutting chickens. Ham and shoulder deboning robots use X-ray detection to automatically determine the left or right side of the ham or shoulder and also measure the length of the bones to locate the joints and ensure a better yield. The system doesn't cut the meat off the bone but rather debones by dismantling. This spares the meat from knife damage, improving final product quality.

Despite the many advantages of using robots in the food industry, robots are not widely used in the food preparation and service industry. It would be desirable to have robust robotic kitchen systems that can be easily moved into new locations with ease. It would also be desirable to have robotic systems in automated food preparation processes, designed to prepare and assemble food items into a variety of containers in any desired pattern, with consistency, and with limited involvement of kitchen workers. Accordingly, a robotic kitchen system and method that overcomes the challenges described above, by eliminating contaminants and preparing consistent flavorful meals is desirable. There is a dire need in the industry for automated food preparation techniques.

SUMMARY

The present technology overcomes the deficiencies and limitations of prior systems and methods, at least in part by, providing systems and methods to automate food preparation. The automated food preparation system in accordance with the present invention comprises a multi-phase process and automated components configured to perform precise food preparation functions repetitively and consistently to deliver uniform results.

In accordance with some embodiments, the automated food preparation system is configured to sequentially perform preparation and assembly tasks that are synchronized in timing. The automated food preparation system comprises robotic elements and controllers, sensor arrays, a synchronization program and mechanical structures configured to operate as activated according to the synchronization program. The automated food preparation system as illustrated is capable of performing a wide range of food preparation steps in a food preparation environment such as a restaurant or a commercial facility.

In accordance with the present invention, the automated food preparation system uses barcode technology to identify a plurality of food-bearing cartridges, carriages, or trays that are placed on a conveyor once identified to proceed to a plurality of food preparation station or sub-system s. Each food preparation station or sub-system is configured to perform a specific function.

In accordance with some embodiments, the automated food preparation system has a cutting or slicing station or sub-system configured to perform a specific function. The cutting or slicing station or sub-system is configured with a plurality of mechanical structures operable by a motor and sensors to cut or slice different vegetables consistently and uniformly before dropping them onto the food-bearing cartridge when the sensors determine that the food-bearing cartridge is aligned with the mechanical structures.

In accordance with some embodiments, the automated food preparation system has a fluid dispensing station or sub-system configured to perform a specific function. The fluid dispensing station or sub-system is configured with a plurality of mechanical structures operable by a motor and sensors to dispense fluids consistently and uniformly onto a food item in the food-bearing cartridges on the conveyor when the sensors determine that the food-bearing cartridge is aligned with the fluid dispensing mechanical structures.

In accordance with some embodiments of the present invention, the automated food preparation system has a robotic mechanism configured with sensors and a driver to perform a specific function, for example, grip a food item and place it on the conveyor. The robotic mechanism consistently and uniformly places a food item on the food-bearing cartridges on the conveyor when the sensors determine that the food-bearing cartridge is aligned with the robotic mechanism. Alternatively, the robotic mechanism may be used to perform other functions, for example, assemble packaging or the like.

In accordance with some embodiments of the present invention, the various food preparation station or sub-system s with mechanical structures configured to perform specific functions are synchronized by programmed instructions that trigger actions based on signals output by sensors.

The system and methods disclosed below may be advantageous in a number of respects. They provide novel ways to prepare food (e.g., hamburgers) consistently and uniformly with meeting health and safety standards monitored by regulatory authorities.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 4A is a flow chart of the automated food preparation process in accordance with one embodiment of the present invention.

FIG. 8 is a flow chart illustrating the synchronized sequence of events in the automated food preparation process in accordance with one embodiment of the present invention.

FIG. 9 is a flow chart illustrating additional operations of the synchronized sequence of events in the automated food preparation process in accordance with one embodiment of the present invention.

FIG. 11 is a block diagram illustrating the sensor arrays used in the automated food preparation process in accordance with one embodiment of the present invention and the sensing actions performed by each sensor array.

DETAILED DESCRIPTION

Figure 1:
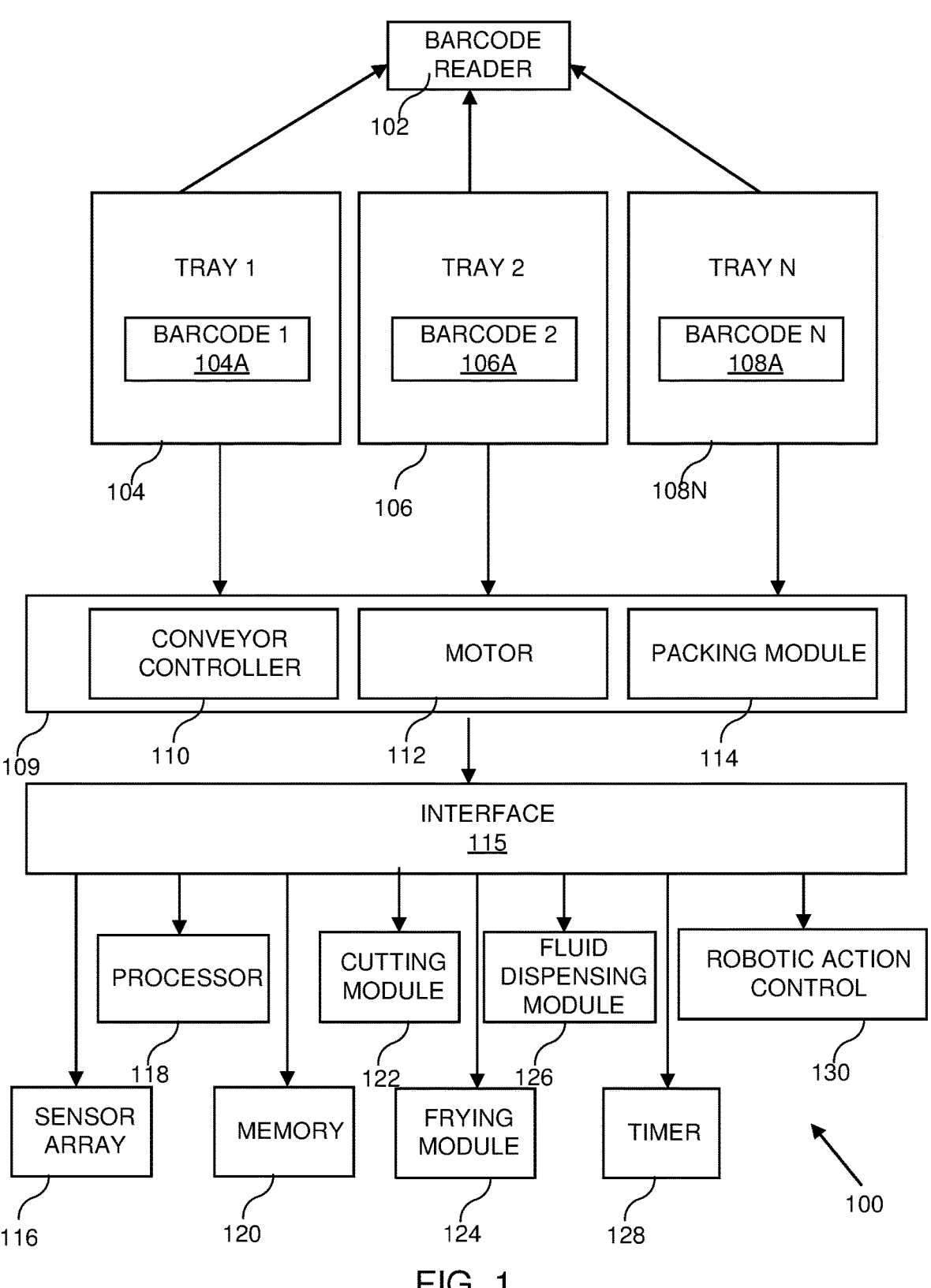
FIG. 1 is high-level block diagram of an automated food preparation system in accordance with the present invention.

The systems and methods for automated food preparation in accordance with some embodiments of this technology are configured to be implemented in a food-preparation area, for example, in a commercial venue such as a restaurant, or the like.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, refer to actions and processes of a computer system or controller, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a special computer program stored in the computer. Such a computer program may be stored in a computer-readable storage medium, such as, but not limited to, any type of disk including floppy disks, optical disks, CD-ROMs, and magnetic disks, read-only memories ("ROMs"), random access memories ("RAMs"), EPROMs, EEPROMs, magnetic or optical cards, flash memories including USB keys with non-volatile memory or any type of media suitable for storing electronic instructions, each coupled to a computer system bus.

Some portions of the present technology may take the form of an entirely hardware embodiment (implemented by mechanical structures and associated circuitry to propel movements of the mechanical structures) or an implementation containing both hardware and software elements. In some implementations, certain parts of this technology are implemented in software, which includes but is not limited to, firmware, resident software, microcode, etc.

Furthermore, certain parts of this technology may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus as illustrated in the drawings or may include more processors and memory elements distributed in remote locations. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) may be coupled to the automated food preparation system either directly or through intervening I/O controllers. Although these devices are not separately shown, one skilled in the art would understand that they are peripheral devices that may be easily linked to the processor to control or display actions of the processor.

Network adapters may also be coupled to the automated food preparation system to enable the data processing system to become coupled to other data processing systems or remote printers or storage devices in a distributed environment through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with special programs in accordance with the teachings herein, or it may prove convenient to construct more specialized apparatuses to perform the required method steps. The required structure for a variety of these systems will appear from the description below. In addition, the present invention is not described with reference to any particular programming language for executing actions within the automated food preparation system. It will be appreciated that a variety of programming languages, for example, high level programming languages such as "C," "Java," "Pascal," or "Python," may be used to implement the teachings of the technology as described herein. The computers used in this technology may be specially programmed, and be configured with special purpose hardware. Each computer may have a single processor as illustrated in the drawings, a multiprocessor or may comprise multiple computers, each of which may include a single processor or a multiprocessor, operably connected over a computer network. Each computer may be controlled by one of a variety of operating systems including Microsoft Windows, Macintosh, Linux, Unix, or a Java-based operating system, to name a few.

Each computer or computing device in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular type of computer platform, processor, or high-level programming language.

It should also be recognized that the various engines and modules described here are operated by one or more processors that comprise an arithmetic logic unit, a microprocessor, a general-purpose controller or some other processor array to perform particular computations as programmed and provide electronic display signals to a display device. Each processor used is coupled to a bus for communication with the other components. The processor processes data signals and may comprise various computing architectures including a complex instruction set computer ("CISC") architecture, a reduced instruction set computer ("RISC") architecture, or an architecture implementing a combination of instruction sets. In the embodiments described, although only a single processor is referenced, multiple processors may be included. It will be obvious to one skilled in the art that other processors, operating systems, sensors, displays and physical configurations are possible. In addition, each processor is coupled to a memory that stores instructions and/or data that may be executed by the processor. The memory is coupled to the bus for communication with the other components. The instructions and/or data may comprise code for performing any and/or all of the techniques described herein. The memory may be a dynamic random-access memory ("DRAM") device, a static random-access memory ("SRAM") device, flash memory or some other memory device known in the art.

For the purpose of this description, it should be understood that the word "automation" refers to automatic working of a machine, process, or system by mechanical or electronic devices that take the place of humans. It should be recognized by those skilled in the art that machines are precise, which helps keep everything standard in a way that is difficult to achieve with humans. Consistent quality is easily accomplished.

System Architecture Overview

An example automated food preparation system is illustrated generally in FIG. 1 and designated by reference numeral 100. The automated food preparation system 100 is designed and configured to automate the various functionalities involved in preparing food, for example, preparing and assembling hamburgers. The automated process starts with identifying a plurality of food trays on which different food items are assembled. The plurality of trays is illustrated and identified as "TRAY 1," designated by reference numeral 104, "TRAY 2," designated by reference numeral 106, through "TRAY N," designated by reference numeral 108. It should be recognized that the number "N" represents that any number of trays may be identified, for example, hundreds or thousands, depending upon the size of the restaurant or facility. A set of trays may be sequentially identified by location or by an organization with a plurality of locations. Each of the trays includes a barcode, which is read by a barcode reader or barcode scanner 102. For example, tray 1 (104) has a barcode 1 (designated by reference numeral 104A), tray 2 (designated by reference numeral 106) has a barcode 2 (designated by reference numeral 106A), and tray N (designated by reference numeral 108) has a barcode N (designated by reference numeral 108A). Each of the trays 1-N are identified to the automated food preparation system 100 by a unique identifier as conveyed by each bar code. Each of the trays is loaded in sequence on a conveyor 109. The conveyor 109 transports a tray carrying food items along a path. In some embodiments, as illustrated in FIG. 1, the conveyor 109 may comprise a frame (also designated by reference numeral 109), a conveyor platform (also designated by reference numeral 109), a conveyor controller 110, a motor 112, an endless conveyor belt (also designated by reference numeral 109), and a packing module 114. The motor 112 with the conveyor controller 110 pulls the conveyor belt across the top of the conveyor platform 109 to transport the food products. The belt then turns below the conveyor platform 109 to drop the food products at an end location and return to the other end of the platform. In some embodiments, because it is critical that the food be free of excess grease, dirt, and crumbs, the conveyor belt and conveyor platform 109 may in some embodiments be configured with openings to permit debris to fall through the endless conveyor belt and the platform 109 and into a collection pan (not shown) under the frame. In other embodiments, the conveyor platform 109 may be configured without openings. It should be recognized by those skilled in the art that the conveyor may be configured in different ways and is one that is suitable for use with food and meets designated sanitary requirements.

As illustrated, the conveyors 109 are coupled via an interface 115 to various components configured to perform the various functionalities of the automated food preparation system 100. The various components include a sensor array 116 including a plurality of sensors or sensor arrays positioned at strategic locations to ensure smooth transitioning between the sequence of operations performed by the automated food preparation system 100, a processor 118, and a memory 120 for storing executable code to drive the process. A cutting module 122 performs the cutting or slicing functionalities required to prepare vegetables. The cutting module 122 includes mechanical structures configured to receive food items, for example, particular vegetables such as onions and tomatoes, and cut or slice them in repeated, uniform actions, when instructed by the processor 118. The processor 118 may comprise speech recognition to receive natural speech and transform them into control actions to execute the cutting module 122. In some embodiments, the mechanical structures may be a plurality of "hoppers" configured to receive the vegetables with a cutting or slicing mechanism affixed relative to the hoppers to slice the food item in repetitive motions. A "hopper" refers to a container configured discharge its contents at the bottom. A different hopper may be designated for each different type of vegetable (e.g., tomato, onion, etc.). Each of the hoppers may be cylindrical in shape and operable in an upright position. In some embodiments, the cutting mechanism uses two types of motion, pushing forward and slicing back and forth. A retaining plate is used for retaining the food item in position. The cutting mechanism is activated by the processor 118 (FIG. 1) or action controller 324 (FIG. 3) at which point, the retaining plate attaches rigidly to the cutting blade, which performs the cutting action and allows the piece that it cut to slide through an opening between the cutting blade and the retaining blade. The two types of motion are generated by two actuators attached to a rigid body comprising a retaining plate and a cutting blade, such that the first actuator is used to move the whole retaining plate and the cutting blade back and forth. The second actuator is used to push forward the first actuator together with the attached retaining plate and cutting blade. In some embodiments, when a hopper is empty, a sensor disposed in the hopper detects that it is empty and provides an alert (either by a light, sound, or the like) to signal an operator to fill the hopper. In some embodiments the robotic mechanism may perform this function instead of a human operator. In addition, in some embodiments, the robotic mechanism may be used to collect different vegetables or toppings from different hoppers before putting them on to the food item (e.g., half hamburger) on the conveyor 109.

The cutting module 122 is coupled to a refrigeration system or may be configured to incorporate refrigeration element to maintain the vegetables and such food items at optimal food temperatures for safety and quality. It should be recognized by those skilled in the art that for optimal quality and safety, diary products should be stored at refrigerated temperatures between 34 degrees F. and 36 degrees F., meats between 33 degrees F. and 36 degrees F., and eggs between 33 degrees F. and 37 degrees F., and fresh vegetables and ripe fresh vegetables should be stored between 35 degrees F. and 40 degrees F. In general, all refrigerated foods should be stored at temperatures less than 40 degrees F. Depending on what is being stored, temperatures in restaurant storage may range from below 0° F. to 140° F. Dry storage temperatures should be maintained between 50° F. and 70° F. Freezers must keep food frozen solid with a temperature of 0° F. at greatest. Refrigeration units should be kept between 32° F. and 40° F. to prevent growth of bacteria. Hot food storage should be kept at a minimum of 140° F. These temperature ranges are critical to prevent food borne illness. The temperatures may be continuously tracked by either a temperature monitoring system coupled to the modules described here or a remote temperature monitoring system. An intelligent sensing and tracking module for gauging temperature levels and reporting them to a remote controller that may be viewed via an application on a mobile phone is one way to ensure proper temperatures. It should be understood by those skilled in the art that any food that leaves these ranges, albeit for a short time, should be discarded immediately.

A frying module 124 performs frying or cooking functions, for example, to fry fries. A fluid dispensing module 126 dispenses fluids, for example, sauces at designated times. The fluid dispensing module 126 comprises mechanical structures including containers that are configured to contain a designated amount of fluid (e.g., a liquid and/or particular types of sauces) and dispense the fluids, for example, particular types of sauces. In some embodiments, the fluid dispensing module 126 includes a peristaltic pump that is used to dispense a particular sauce from a sauce container. The sauce container includes a plastic tube, through which the sauce is transported to be dispensed via a head with multiple openings. The peristaltic pump has rollers or shoes that compress the tube or hose as it rotates, creating a vacuum, which draws fluid through the tube. Advantageously, only the pump tube or hose touches the fluid, eliminating the risk of the pump contaminating the fluid, or the fluid contaminating the pump. The fluid is drawn into the pump tube or hose, trapped by the pump head roller, and expelled when the next roller passes over the tube. As the rollers rotate, a vacuum is formed in the tube, pulling in more fluid, for the next roller pass. The complete closure of the tube when is it occluded (squeezed) between the roller and the track, gives the pump its positive displacement action, preventing backflow and eliminating the need for check-valves when the pump is not operating.

In the illustrated embodiment, the fluid dispensing module 126 has four fluid or sauce containers, with all sauces dispensed via this single multi-opening head. It should be recognized that the fluid dispensing module 126 may include less than four or more than four fluid containers. A timer 128 synchronizes timing of the functionalities and transition from one operation to another. A robotic action control 130 executes robotic actions at the appropriate time. For example, the robotic action control 130 drives the robotic mechanism 501 (FIG. 5) described in further detail below.

Figure 2A:
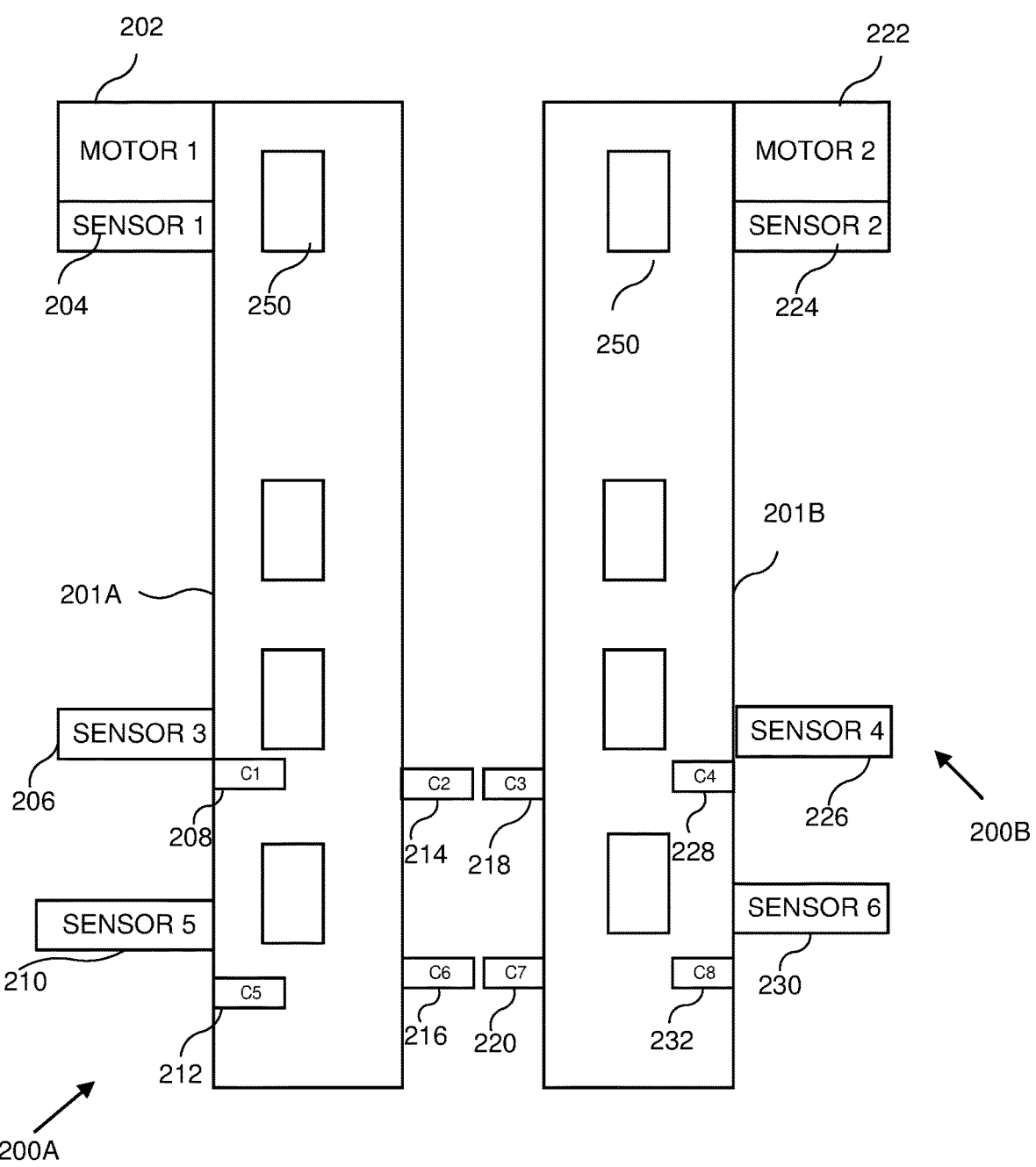
FIG. 2A is a block diagram illustrating the motors and sensor array positioned in a first portion of the automated food preparation system in accordance with the present invention.

Referring now to FIG. 2A, two long conveyor apparatuses (referred to as "conveyors") are illustrated generally at 200A. In this illustrated embodiment, as one example, the automated food preparation system is configured to prepare hamburgers. The first conveyor 201A is illustrated with a motor 202 ("MOTOR 1") and a Sensor 204 ("SENSOR 1"). This first conveyor 201A may be configured for orders that require cheese or such on the hamburger patty. This first conveyor 201A may have a heating lamp (not shown) disposed over it to melt the cheese. Tray mechanisms or food bearing cartridges (referred to as "trays") are shown as moving on the conveyor, as designated by reference numeral 250. The second conveyor 2018 is illustrated with a motor 222 ("MOTOR 2") and a Sensor 224 ("SENSOR 2"). The second conveyor 201B is configured to carry order for hamburgers with no cheese or such. This second conveyor 201B does not require a heating map to be positioned over it. The two long conveyors 201A and 201B move the trays toward the first station or sub-system, which in this instance is the cutting module 122 (FIG. 1). The first conveyor 201A has a sensor 3 ("SENSOR 3") 206 and a sensor 5 ("SENSOR 5") 210. The sensor 206 is positioned adjacent a cylinder "C1" and the sensor 210 is positioned halfway between cylinders "C1" 208 and "C5" 212. The cylinders "C2" 214 and "C6" 216 are positioned directly across. The second conveyor 201B has a sensor 4 ("SENSOR 4") 226 positioned adjacent cylinder "C4" and a sensor 6 ("SENSOR 6") 230 positioned between cylinders "C4" 228 and "C8" 232.

In operation, in the illustrated embodiment, the sensors serve to perform specific functions. For example, the sensors used on the packing conveyor or in the fries-conveyor are ultra-slim photoelectric sensors and the sensors used in the cutting module 122 and the fluid dispensing module 126 are u-shaped micro photoelectric sensors. For the first conveyor 200A, there is an arrangement of sensors 1, 3, and 5, positioned near cylinders 1, 2, 5, and 6. In some embodiments, the cylinders are electric cylinders. Sensor 1 determines an input representative of whether the hamburger component (e.g., patty) is present or absent. Sensor 3 determines pre-loading the hamburger component (e.g., patty) to position for action by the cutting module 122. Sensor 3 is positioned near cylinders C1 and C2. Cylinder "C1" is the infeed holding barcode alignment left cylinder. Cylinder "C2" is the infeed holding barcode alignment right cylinder.

In some embodiments, a hamburger may be prepared and placed on the conveyor by a human operator. In other embodiments, the hamburger may be prepared and placed on the conveyor by a robotic arm. In some embodiments, the hamburger may be prepared by a hamburger forming machine that receives raw ingredients via an input and provides a formed hamburger patty as an output. The automated food preparation system in accordance with the present invention is advantageously configured with modules, therefore, additional modules may be easily incorporated in the process. In some embodiments, a mechanism may be configured for continually cooking patties and heating buns so that they may be prepared at one end before being placed on the conveyor in a continuous way, guided by the sensing arrangement of the present invention. It should be understood by those skilled in the art that a hamburger as referred to herein is a piece of meat that consists of minced steak. However, the piece of meat could also be of a different kind such as a piece of chicken, for example, or a meat alternative. It is for this reason that, throughout the description which now follows, the term "hamburger" designates in a general sense, any food product consisting of a piece of meat of any kind or a meat alternative, which must be cooked and placed between two half-rolls of bread or bread alternatives.

Sensor 5 determines if the hamburger component is present or absent for the cutting module. Sensor 5 is positioned near cylinders C5 and C6. Cylinder "C5" is the cutting module left alignment cylinder. Cylinder "C6" is the cutting module right alignment cylinder.

For the second conveyor, there is an arrangement of sensors 2, 4, and 6. Sensor 2 determines an input representative of whether the hamburger component (e.g., patty) is present or absent. Sensor 4 determines pre-loading the hamburger component (e.g., patty) to position for action by the cutting module. Sensor 4 is positioned near cylinder 4. Sensor 6 is positioned near cylinder 8. Cylinder "C4" is the infeed holding barcode alignment right cylinder. Cylinder "C3" is the infeed holding barcode left cylinder. Cylinder "C8" is the cutting module right alignment cylinder. Cylinder "C7" is the cutting module left alignment cylinder.

Figure 2B:
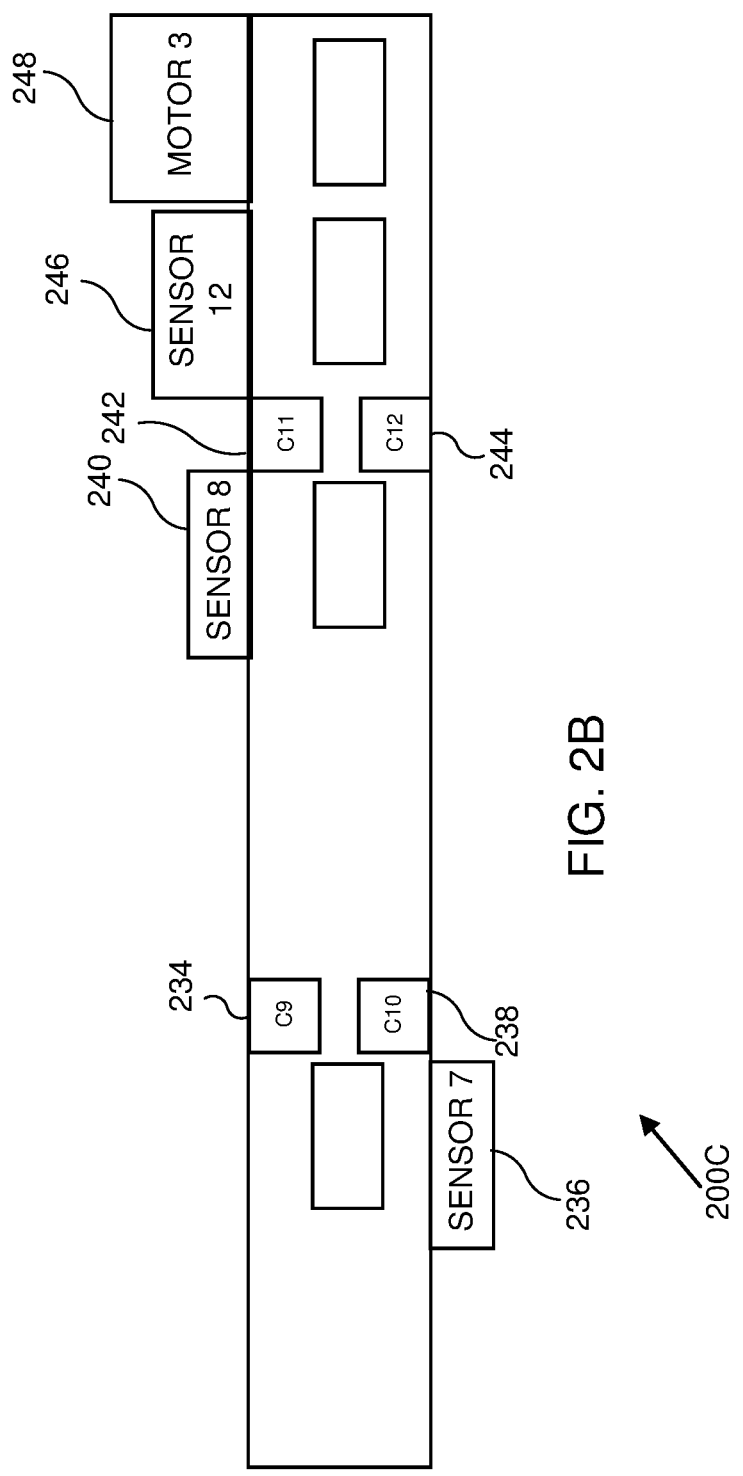
FIG. 2B is a block diagram illustrating the motor and sensor arrangement in a second portion of the automated food preparation system in accordance with the present invention.

FIG. 2B illustrates a third conveyor 200c (e.g., a packing conveyor) with trays or food bearing cartridges moving on the conveyor 200c through a packing module 114 (FIG. 1). A sensor 7 ("SENSOR 7") 236 is positioned near cylinder "C10" 238 with a cylinder "C9" 234 directly across. The sensor 7 positioned near the fluid dispensing module 126 determines an input representative of whether the hamburger component (e.g., patty) is present or absent. Cylinder "C9" is the fluid right alignment cylinder. Cylinder "C10" is the fluid left alignment cylinder.

A sensor 8 ("SENSOR 8") 240 is positioned near cylinders "C11" and "C12." The sensor 8 is configured to determine if the hamburger component (e.g., patty) is present or absent near the packing module. Cylinder "C11" is the packing module right alignment cylinder. Cylinder "C12" is the packing left alignment cylinder.

A sensor 12 ("SENSOR 12") 246 is positioned adjacent a motor 3 ("MOTOR 3") 248. The motors "M1," "M2," "M3," and "M4 in the illustrated embodiments toggle between "on" and "off" to either start or stop the motors when voltage is applied to drive the long conveyors into action.

Figure 2C:
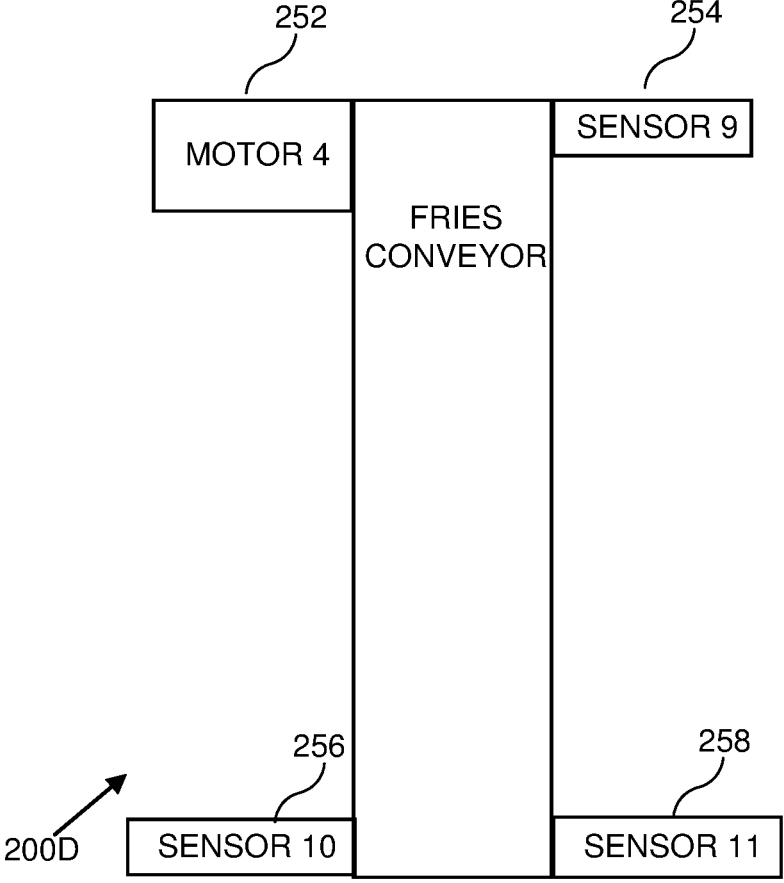
FIG. 2C is a block diagram illustrating the motor and sensor arrangement in a third portion of the automated food preparation system in accordance with the present invention.

FIG. 2C illustrates a "fries" conveyor 200D as an example. This has a motor 4 ("MOTOR 4") 252 and a sensor 9 ("SENSOR 9") 254, as sensor 10 ("SENSOR 10"), and a sensor ("SENSOR 11"). In the illustrated embodiment, sensor 9 determines if the fries are present or absent and is configured to generate an input signal indicating each instance. The sensor 10 determines when the fries are cooked and produces the output, which in this instance is fries without salt. The sensor 10 at this point generate an output signal. The sensor 11 determines when the fries are cooked and produces the output, which in this instance is fries with salt. The sensor 11 at this point generates an output signal.

Figure 3:
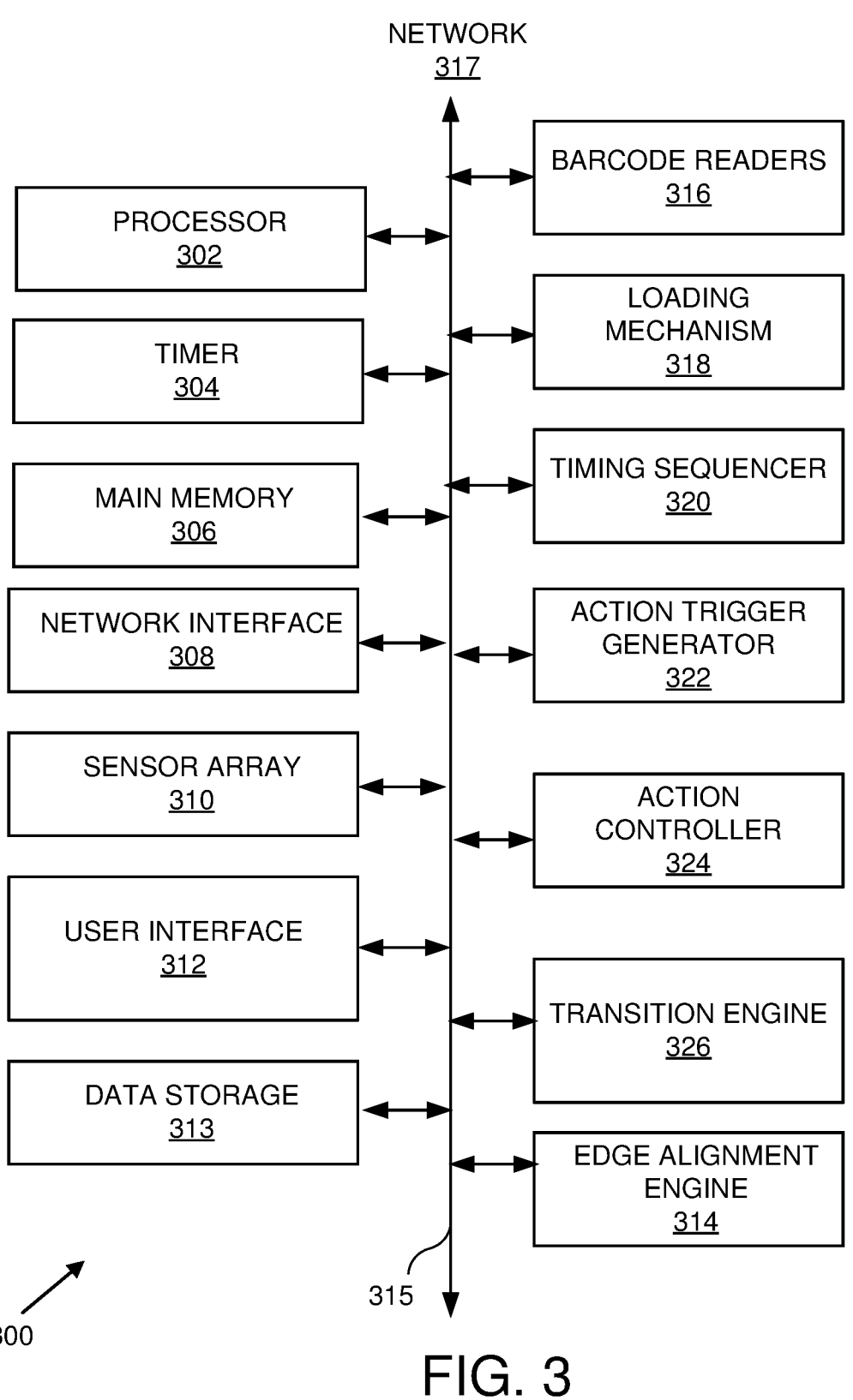
FIG. 3 is a block diagram of the hardware and software components used for automated food preparation in accordance with the present invention. The hardware and software components form a part of the automated food preparation system in accordance with the present invention.

Referring now to FIG. 3, one embodiment of the automated food preparation system is illustrated generally by reference numeral 300. The automated food preparation system comprises a processor 302, a timer 304, a main memory 306, a network interface 308, a sensor array 310, a user interface 312, and a data storage 313.

The processor 302 processes data signals and program instructions received from the main memory 306 and the data storage 313. The processor 302 may comprise an arithmetic logic unit, a microprocessor, a general or special purpose controller or some other processor array to perform computations and provide electronic display signals to a display device (not shown) on a user device that may be used to monitor or track the food preparation process as it flows through the various phases. The processor 302 is coupled to the bus 315 for communication with the other components. The processor 302 may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. It will be obvious to one skilled in the art that other processors, operating systems, sensors, displays, and physical configurations than those that are illustrated may be used to perform the operations described in this specification.

The processor 302 enables a computer-controlled facility that can provide virtually unlimited opportunities to maintain records of all events in the facility's operation. The processor has the capability to collect, store, retrieve, and process data. This data may be used by analytic programs to identify areas of concern and improve processes. Any information may be used for improved productivity, product quality, and profitability. As one example, generating ingredient usage reports helps in active inventory control and predictions, eliminating undue waste and food materials typically have a short shelf life. Such reports may be generated for daily, weekly, monthly, and yearly use to give a quantitative picture of comparisons necessary for future planning. The processor 302 provides a smart system that can also monitor and record periodic and transient variations in product variables. An operator can use these records to monitor real time, alter set points, change system configurations, perform testing, etc. Any of the reports may be transmitted over the network 317.

The timer 304 may be a timing device, a clock or a program written to track the timing pattern and phase of the food preparation system 300. The main memory 306 may be a non-transitory storage medium. The main memory 306 stores the instructions and/or data for operating the automated food preparation system 300, which may be executed by the processor 302. In one implementation, the instructions and/or data stored in the main memory 306 comprises code for performing any and/or all of the techniques or functionalities that are described in this specification. The main memory 306 may be a dynamic random-access memory (DRAM) device, a static random-access memory (SRAM) device, flash memory or some other memory device known in the art.

The data storage 313 stores the data and program instructions that may be executed by the processor 302. In one implementation, the data storage 313 may store the data of various types of users in the web forum. The data storage 313 may include a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

The network interface 308 is a communication unit designed to facilitate communication between a user device and the automated food preparation system 300 over the network 317. For example, a user (e.g., food operator) may use a user device (computer or mobile device), to access the automated food preparation system 300 to view or read electronic content and otherwise interact with the system and receive information from the system, via the network interface 308. The network interface 308 also displays the content or information either received from or hosted on the system 300 to any of the users who desire access.

The network interface 308 couples the system 300 to the network 317 via the bus 315. The network interface 308 may include network interface modules, which include ports for wired connectivity such as but not limited to USB, SD, or CAT-5, etc. The network interface modules are configured to link the processor 302 to the network 117 that may in turn be coupled to other processing systems. The network 117 may be of conventional type, wired or wireless, and may have any number of configurations such as a star configuration, token ring configuration or other configurations known to those skilled in the art. Furthermore, the network 317 may be a local area network ("LAN"), a wide area network ("WAN") (e.g., the Internet), and/or any other interconnected data path across which multiple devices may communicate. In some embodiments, the network 317 may be a peer-to-peer network. The network 317 may also be coupled to or includes portions of a telecommunications network for sending data in a variety of different communication protocols. In yet another embodiment, the network 317 may include Bluetooth communication networks or a cellular communications network for sending and receiving data such as via short messaging service ("SMS"), multimedia messaging service ("MMS"), hypertext transfer protocol ("HTTP"), direct data connection, WAP, email, etc. The network interface modules are configured to provide conventional connections to the network 317 using standard network protocols such as TCP/IP, HTTP, HTTPS and SMTP, as well as, any others that are understood to those skilled in the art. The network interface modules include a transceiver for sending and receiving signals using WIFI, Bluetooth® or cellular communications for wireless communication. Each of the platforms, modules, and/or engines described above may include software or program instructions configured to perform the functionalities described here.

One or more bar code readers 316 are illustrated, which as illustrated as identifying each tray of the plurality of trays illustrated in FIG. 1. It should be recognized by those skilled in the art that barcode tracking is easy to use and a cost-effective way to manage and track the trays, requiring only the bar code reader 316 and barcode labels (104A. 106A, and 108A in FIG. 1), which are affixed to each of the trays 104, 106, and 108 (FIG. 1). Barcode labels in a variety of different forms may be used. For example, in some embodiments, identification ("1D") barcodes such as "Code 39" and "Code 128" may be used. Alternatively, in other embodiments, 2D barcodes such as Data Matrix and Quick Response ("QR") codes may be used. Although their capabilities vary, each type of barcode label is used to store data. This data is represented by different numbers and letters, which is then decoded by the reader 316 typically in the form of a barcode scanner or mobile device. The barcodes may be conveniently printed on-site and affixed to each tray. Once data (by the processor 302) has been assigned to a unique barcode, it is printed and affixed to an asset. Using bar codes on trays replaces time-consuming manual tracking methods. The full inventory of trays may be tracked by using a product or asset tracking software stored in the data storage 313. In operation, data is stored on each unique barcode that is printed and assigned to each tray. The barcode is scanned using the bar code readers 316, which may be a scanner or a mobile device that extracts the data. The data is sent to the processor 302 in binary form which is then decoded and stored in a product or asset tracking software database implemented in the data storage 313.

It will be recognized by those skilled in the art that the bar codes typically consist of various sized bars and spaces that represent numbers and letters. The bar codes may be "1D" barcodes (linear) or "2D" barcodes. 1D barcodes are configured to hold up to 100 characters of data and may be affixed to the trays in the form of universal product codes ("UPCs"). 2D barcodes may hold up to 2000 characters of data and appear in the form of QR codes.

A loading mechanism 318 is configured to facilitate loading of the trays 104, 106, through 108N onto the conveyor 109. The timing sequencer is the software module that tracks the programmed timing of each phase in the automated food preparation system 300. The action-trigger generator 322 is configured to generate action triggers based on signals or output from the sensor array 310. When an action trigger or signal is received from the action trigger generator 322, the action controller 324 executes each action in the various phases of the automated food preparation system 300. The transition engine 326 controls the transition between the different phases in the automated food preparation process. The edge alignment engine 314 in collaboration with the sensor array 310 is instrumental in detecting the edge of the food item (e.g., a hamburger patty) before dropping a sliced vegetable (e.g., tomato) over it or dispensing a sauce over an assembled hamburger.

Figure 4B:
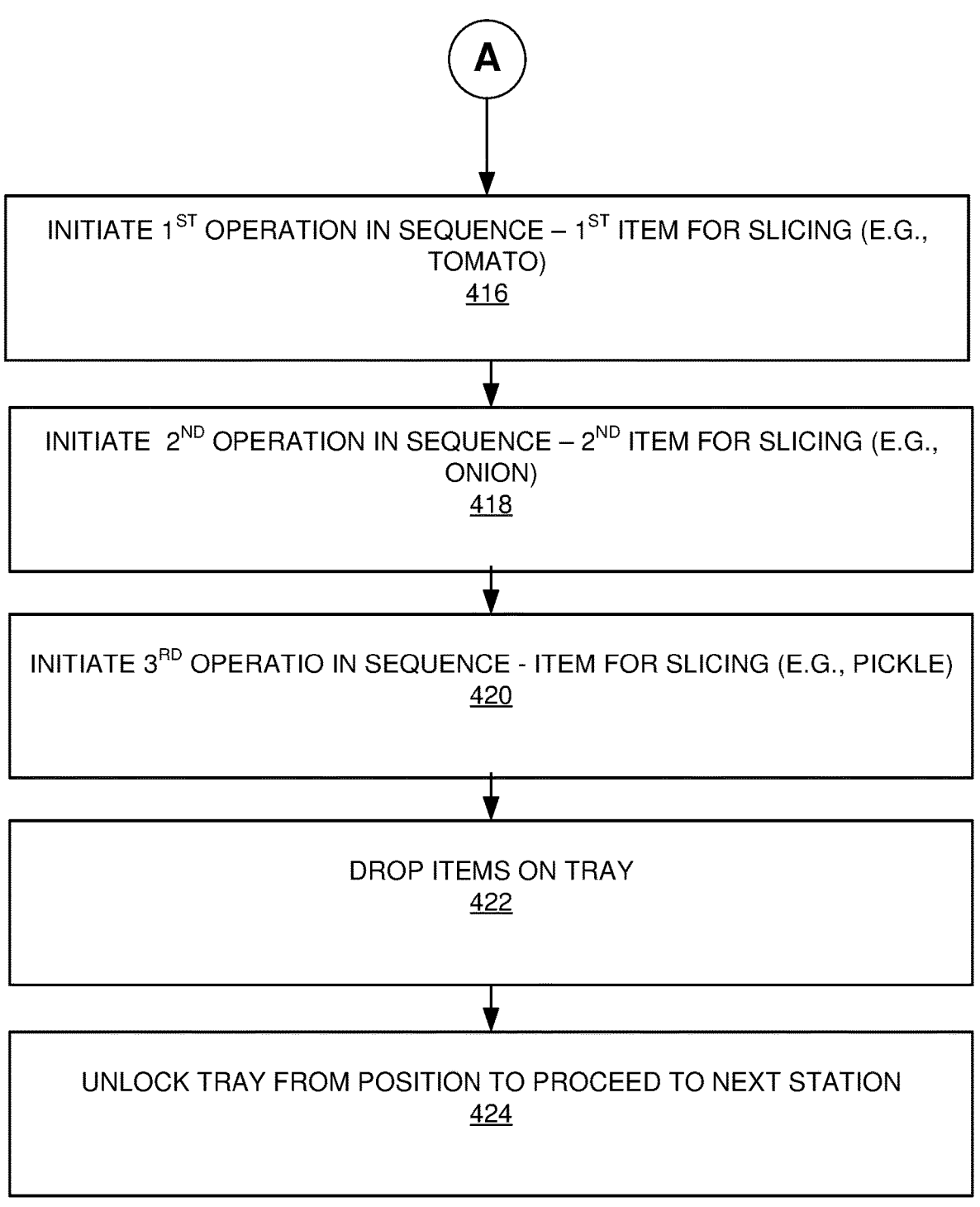
FIG. 4B is a continued flow chart of the automated food preparation process in accordance with one embodiment of the present invention.

Referring now to FIG. 4A, the automated food preparation process designated generally by reference numeral 400 starts at block 402, including one or more operations for registering a set of trays to a point-of-sale ("POS") location, which for example, my be a restaurant or such commercial facility. It should be recognized by those skilled in the art that the POS location as referred to in this application represents a location where the automated food preparation system is implemented to sell food items (e.g., hamburgers) to consumers. It is the location where a consumer makes the final purchase of the food item. It should be understood that the POS location may be one where a large number of food items are prepared, but the sale may be at other locations, through a delivery service, website, grocery store, convenience market, or other ways know to disburse food items in commerce. The POS location may also be a kiosk located in a restaurant, bar, coffee shop, airport, or the like. It may be incorporated in an eatery that is large or small, from a food truck to a restaurant for fine dining. It may be used in any location where consistency, speed, and efficiency are of paramount importance.

A plurality of POS locations maybe linked by a POS software that may be used to manage all aspects of sales, customer service, inventory, revenue etc. Inventory quantities and details at any time and at any restaurant is easily managed. For example, inventory in a chain of restaurants may be easily identified, transferred and generally managed. In some embodiments, a handheld device such as a mobile device may be used to enter a purchase order, scan and receive inbound inventory, and assign a barcode to any products required in the automated food preparation process, for example, the trays 104, 106, through 108N.

As further illustrated in block 402, once all the trays are identified, the automated food preparation starts by activating the automated food preparation sequence at the desired location (e.g., designated POS location). The sequence starts at an initial start time. The process 400 proceeds to the next block 404, including one or more operations for sequentially loading trays (104, 106, through 108N) with bar codes (104A, 106A, and 108A) on the conveyor 109 at designated time intervals controlled by a timing sequence (e.g., controlled by the processor 118 and the timer 128 in FIG. 1). In some embodiments, the timing sequence is set by the timing sequencer 320. The process 400 proceeds to the next block 406, including one or more operation for reading each bar code on each tray at a bar code station or sub-system or sub-system. The process 400 proceeds to the next block 408, including one or more operations for unlocking the tray and releasing it from its position to enable transition to the next phase or operation in the programmed sequence. The process 400 proceeds to the next block 410, including one or more operation for transitioning to the next operation at a cutting station or sub-system or sub-system after pre-designated time period elapses. The process 400 proceeds to the next block 412, including one or more operation for activating parallel, linear actuators at the cutting station or sub-system to move at high speed and perform repetitive slicing tasks quickly and consistently of different food items required for food preparation or assembly, for example tomatoes, onions, pickles for preparation of hamburgers or the like. The process 400 proceeds to the next block 414, including one or more operation for advancing timing sequence to initiate associated operations, for example, a $1^{st}$ operation sequence, a $2^{nd}$ operation sequence, until an N°d operation sequence. Each operation sequence represents a step in a multi-phase or multi-step automated food preparation process or may represent an entire cycle involving the various steps in each cycle from start to finish. The process proceeds through connector "A" to the next block of operations illustrated in FIG. 4B. The process 400 proceeds to the next block 416, including one or more operations for initiating a first operation in the sequence, which is slicing a first food item, for example a tomato. The process 400 proceeds to the next block 418, including one or more operations for initiating a second operation in the sequence, for slicing a second vegetable, for example, an onion. The process 400 proceeds to the next block 420, including one or more operations for initiating a third operation in the sequence, for slicing a third vegetable or condiment, for example, a pickle. Each of these sequences may be programmed to occur simultaneously or offset by a predesignated time to allow each vegetable to be ready at predesignated times. The process 400 proceeds to the next block 422, including one or more operations for dropping the items on the tray 108N as it passes under the module on the conveyor 109. The process 400 proceeds to the next block 424, including one or more operations for unlocking the tray 108N from position to proceed to the next station or sub-system (e.g., different modules such as the cutting module etc.) or phase in the automated food preparation.

Figure 5:
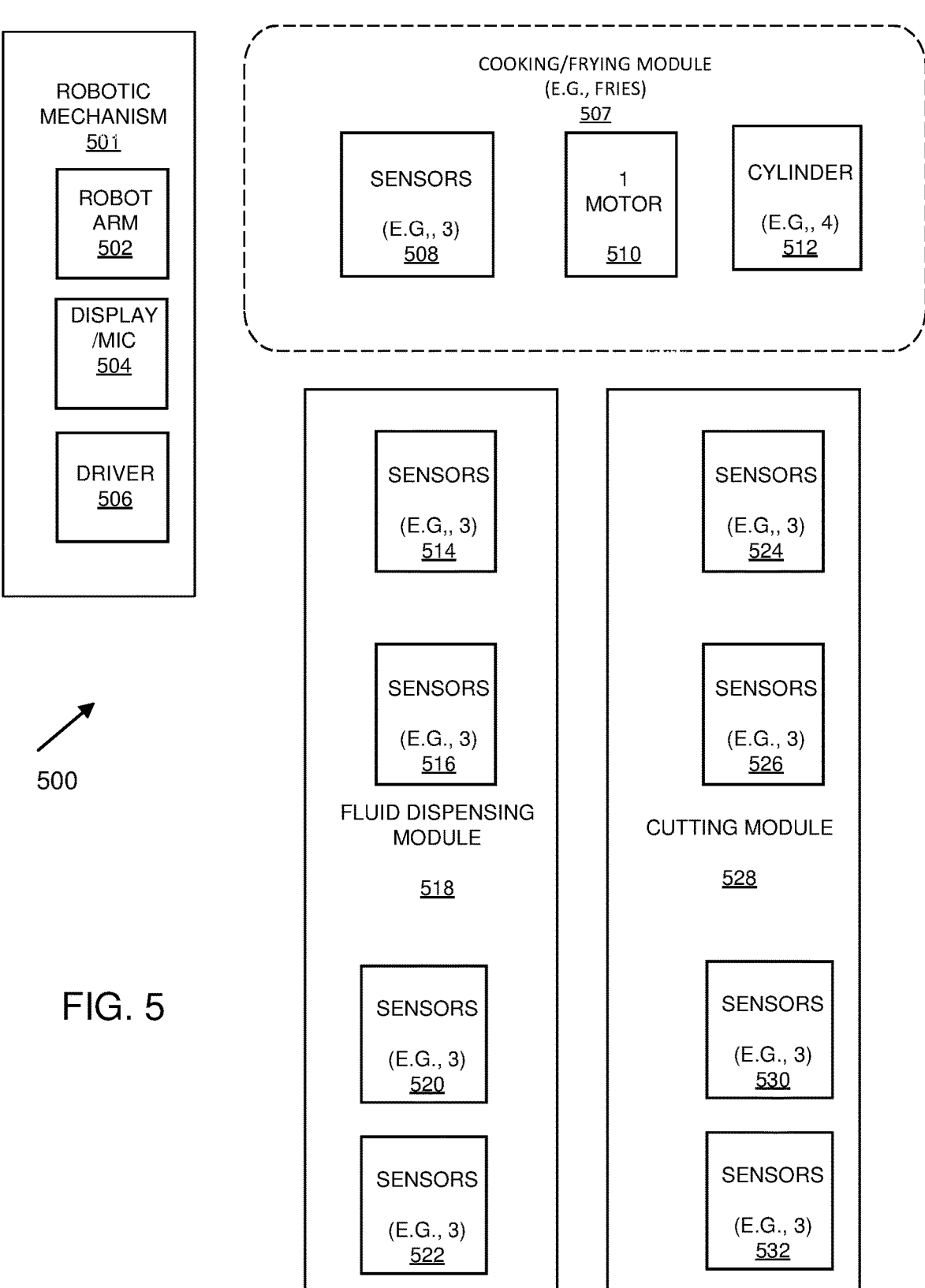
FIG. 5 is a block diagram of the robotic mechanism and the outfeed module of the automated food preparation process in accordance with the present invention, illustrating various modules including the cooking/frying module, the fluid dispensing module, and the cutting module.

Referring now to FIG. 5, the robotic mechanism 501 is illustrated with components including a robot arm 502, a display 504, and a driver 506. The robot arm 502 represents a single manipulator arm or a dual manipulator arm configuration that may work alone or in collaboration with human input. It is configured to be compact and precise in its movement and may be used for tasks such as placing items on the conveyor 109. The robotic mechanism 501 or robot arm 502 used may be configured on wheels or located in a station or sub-system in a designated position and has a display either on it or associated with it. The display 504 may be used to show different expressions to simulate a human presence or may be used to display messages to consumers. The robotic mechanism's driver 506 is the controller that controls the repetitive actions (with the robotic action control 130 in FIG. 1). In some embodiments, the robotic mechanism is controlled by a user's voice. For example, a user may give natural speech commands, which are instantly interpreted and implemented by the robotic mechanism 501. For this purpose, the robotic mechanism 501 has a microphone, speakers, a battery etc. The driver 506 may include a processor or software configured to control robotic actions such as gripping food items (e.g., cut vegetables taken from hoppers) to place them on food items on the conveyor 109 or the like.

FIG. 5 further illustrates a frying (or cooking) module 507, which in one example, may prepare fries. This module 507 includes an array of sensors 508, a motor 510, and a cylinder 512. FIG. 5 also illustrates a fluid module 518, which in the example illustrated has an array of sensors positioned in each of the fluid dispensing structures. The sensor arrays include a first array 514, a second array 516, a third array 520, and a fourth array 522. The vegetable cutter module 528 includes a first array of sensors 524, a second array of sensors 526, a third array of sensors 530, and a fourth array of sensors 532.

Figure 6:
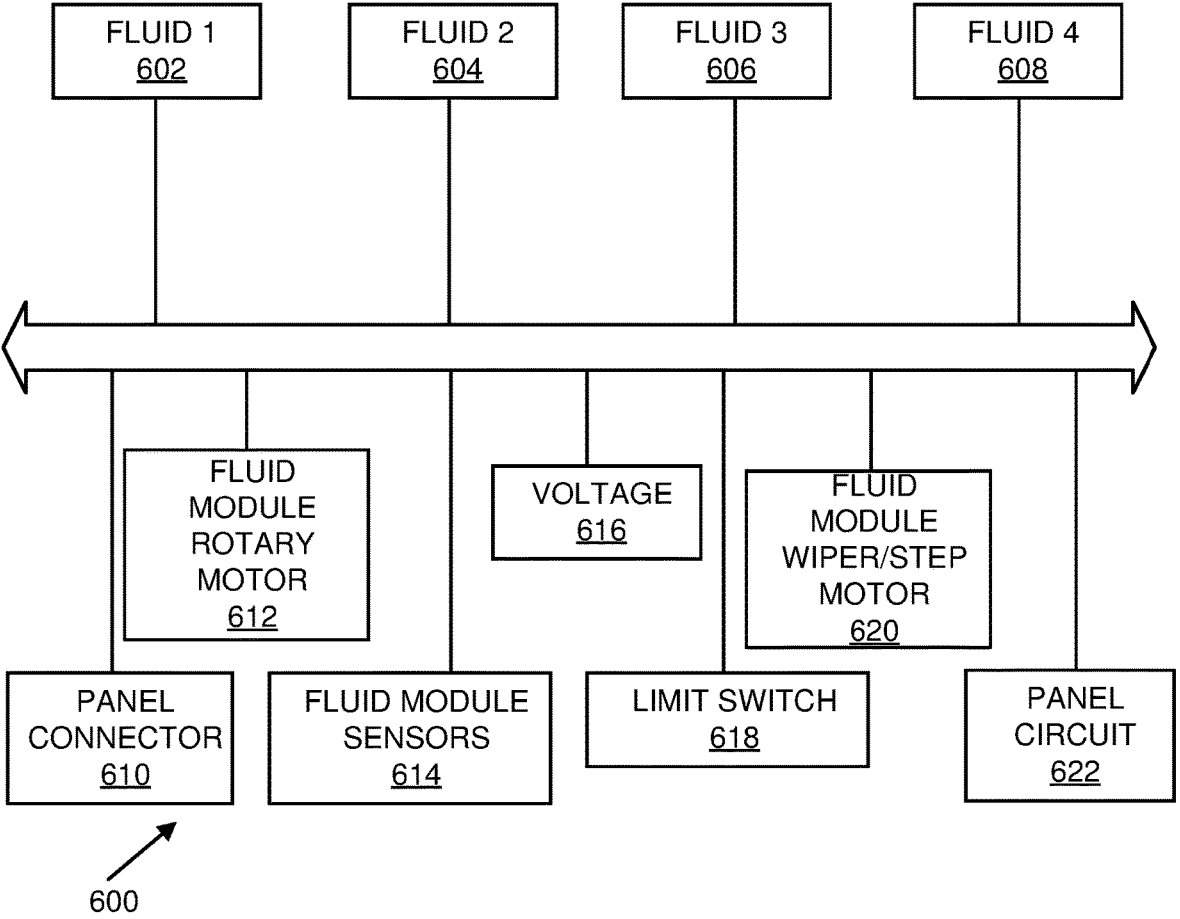
FIG. 6 is a block diagram of the fluid dispensing module in accordance with one embodiment in the automated food preparation process in accordance with the present invention.

Referring now to FIG. 6, the fluid module 600 includes four different fluid dispensing structures, including a first fluid dispenser 602, a second fluid dispenser 604, a third fluid dispenser 606, and a fourth fluid dispenser 608. Each mechanical structure is coupled to electrical circuitry to operate the fluid module 600. The electrical circuitry is implemented by a panel connector 610 configured to connect the mechanical structures to the other components, a fluid module rotary motor 612, fluid module sensors 614, voltage supplier 616, a limit switch 618, a fluid motor module 620 (representing a step motor for each cylinder in the fluid dispenser) and a wiper motor, and a panel circuit 622. The fluid module rotary motor 612 is configured to move the fluid dispensing module 126 (FIG. 1), which may be a mechanical structure with parts, cylindrical or otherwise, designed and configured to dispense fluids at designated times. In some embodiments, the fluid dispensing module 126 has cylindrical mechanical structures that are rotated to align over a food item at a predesignated time (indicated by the timer 128 and sensor array 116) to dispense an amount of fluid (e.g., liquid or sauce) onto the food item (e.g., hamburger patty). In some embodiments, the fluid dispensing module 126 is configured to selectively dispense toppings onto an effector of the robotic mechanism 501 (e.g., an arm 502) that drops the selected toppings onto the food item. The voltage supplier 616 may be a standard power supply configured to take the alternating current ("AC") from a wall outlet, to convert it to unregulated direct current ("DC"), to reduce the voltage using an input power transformer to step it down to the voltage amount required by the load. For safety, the transformer also separates the output power supply from the main input. The fluid module step motor 620 is configured may be configured with a wiper switch, wiper linkage, wiper arm (one or more), and a wash fluid reservoir and a simple DC motor configured to operate at a single speed or variable speeds. The limit switch 618 is configured to determine the presence or absence of the food time (or any other object). In some embodiments, the limit switch 618 provides an output signal to the edge alignment engine 314 (FIG. 3), which executes the action controller 324 to send a signal to the action-trigger generator 322 to drive the various modules to perform their specific functions. It should be understood by those skilled in the art that the limit switch used here is an electromechanical device consisting of an actuator mechanically linked to an electrical switch. In the illustrated embodiments, for example, when the tray contacts the actuator, the switch will operate causing an electrical connection to make or break. It should be recognized by those skilled in the art that the limit switch may be in several different configurations, for example, "normally open," "normally closed," or one or each. A microswitch is a type of limit switch 618 that may be used, with two limit switches operating together and sharing a common terminal. One limit switch is normally open and the other is normally closed. The technical configuration is a single pole double throw, referred to as a SPDT. Both switches are mechanically connected and operate at the same time. This limit switch 618 is used to count passing objects or determine the position in a hydraulic cylinder. Alternatively, in some embodiments, proximity sensors may be used. The proximity sensors have no mechanical moving parts and perform the switching actions with electronic switches. The limit switches that may be used, include but are not limited to, whisker, roller, lever, and plunger. Each of these is an electromechanical device with an actuator operated by a physical force applied to it by an object, wherein the actuator is linked to an electrical switch.

Figure 7:
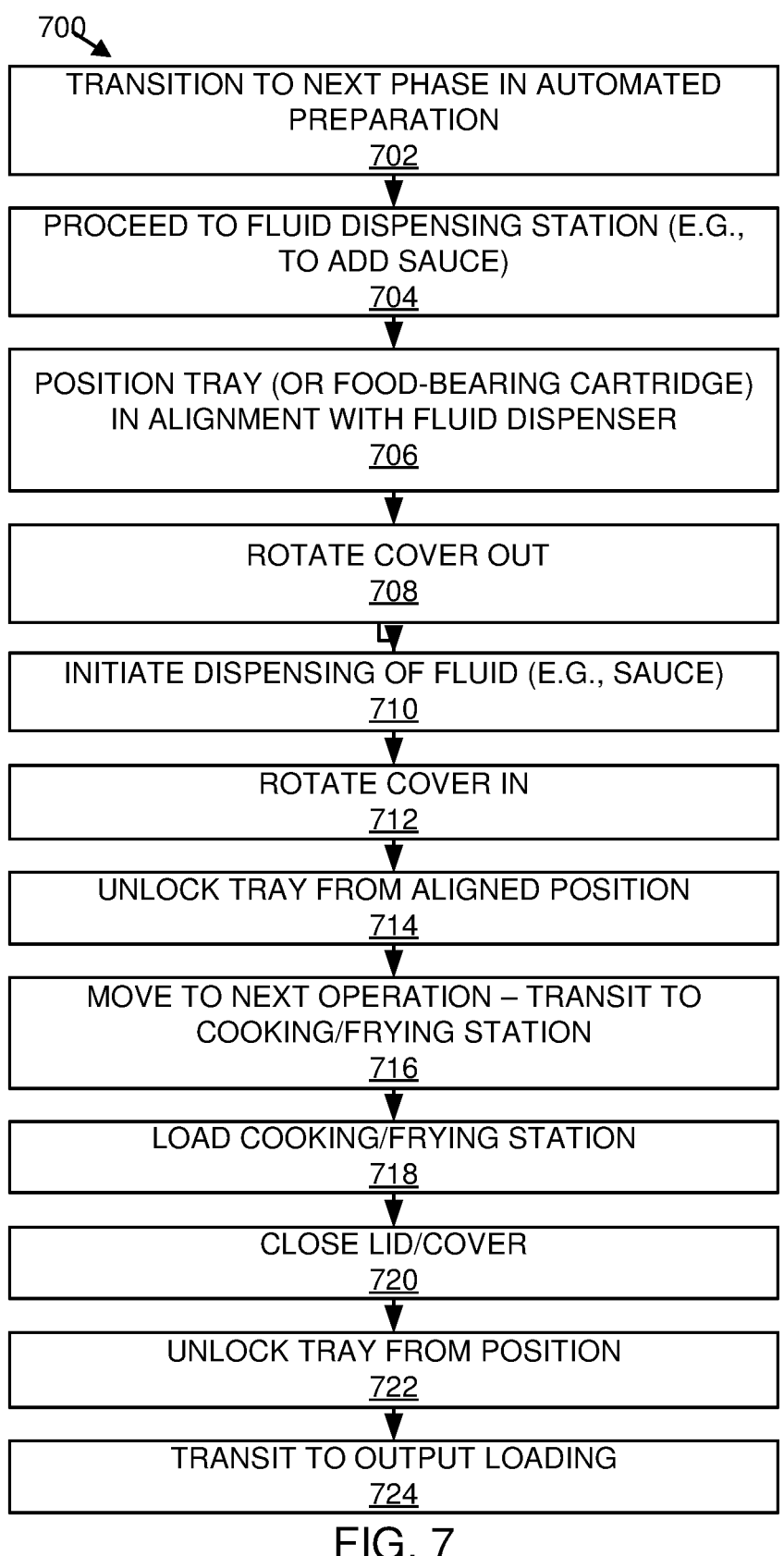
FIG. 7 is a flow chart of the fluid dispensing phase in the automated food preparation process in accordance with one embodiment of the present invention.

Referring now to FIG. 7, the operation of the fluid dispensing module 126 is illustrated by process 700, which begins by receiving an alert that the automated food preparation system 100 (FIG. 1) is moving to the next phase in the automated preparation. The block 702, including one or more operations, is informed of this status. The process 700 proceeds to the block 704, including one or more operations for proceeding to the fluid dispensing station or sub-system, for example to add a sauce. The process 700 proceeds to the next block 706, including one or more operations for positioning the tray (any of trays 1-N) in alignment with the fluid dispenser module 126. The process 700 proceeds to the next block 708, including one or more operations for rotating the cover on each dispensing mechanical structure out to dispense the sauce. The process 700 proceeds to the next block 710, including one or more operations for initiating the dispensing of the fluid, for example, the sauce. The process 700 proceeds to the next block 712, including one or more operations for rotating the cover in after a programmed time period. The process 700 proceeds to the next block 714, including one or more operations for unlocking the tray (any of trays 1-N) of the aligned position. The process 700 proceeds to the next block 716, including one or more operations for transitioning to the next operation, a sequence of operations at the frying station or sub-system. The process 700 proceeds to the next block 718, including one or more operations for loading the frying station or sub-system (507 in FIG. 5). The process 700 proceeds to the next block 720, including one or more operations for closing the lid on the frying station or sub-system. The process 700 proceeds to the next block 722, including one or more operations for unlocking the tray (any of trays 1-N) from its aligned position and proceeding to the next block 724, including one or more operations for transiting to the output loading.

Referring now to FIG. 8, the timing sequence is illustrated and described by the process 800. The process 800 starts at block 802, including one or more operations for synchronizing the sequence of timing with automated food preparation events. The process 800 proceeds to the next block 804, including one or more operations for initiating a barcode reading action (by the barcode reader 102 in FIG. 1) at 3.5 seconds for start time. The process 800 proceeds to the next block 806, including one or more operations for waiting during a "wait time" for the barcode scanner 102 to read the next tray (trays 1-N). The "wait time" is the time that elapses between scanning of trays. In the illustrated embodiment, this "wait time" is programmed to be 5 seconds. The process 800 proceeds to the next block 808, including one or more operations for executing an action to unlock the tray 108N from its position. This action takes 5 seconds in the illustrated embodiment. The process 800 proceeds to the next block 810, including one or more operations for transitioning to the cutting station or sub-system (cutting module 122) after an allotted time of one second. The process 800 proceeds to the next block 812, including one or more operations for initiating a "wait time" before start of robotic action on the vegetables (e.g., robotic action controller 130 in FIG. 1), which is two seconds. The process 800 proceeds to the next block 814, including one or more operations for initiating a "wait time" for start to cutting action for the vegetable sequence, which is 5.5 seconds. The process 800 proceeds to the next block 816, including one or more operations for initiating a "wait time" for cutting action to commence on a first vegetable, for example, a tomato. The "wait time" is 1.5 seconds. The process 800 proceeds to the next block 818, including one or more operations for initiating the allotted time for the cutting action of the first food item, which in this illustrated embodiment is 5.5 seconds. The process 800 proceeds to the next block 820, including one or more operations for initiating the "wait time" for cutting action on the second item to commence. In the illustrated embodiment, the second item is an onion required for a hamburger. The process 800 proceeds to the next block 822, including one or more operations for initiating the allotted time for cutting of the second item (e.g., onion). In this instance, the allotted time is 5.5 seconds. The process 800 proceeds to the next block 824, including one or more operations for initiating the time to transition to cutting of the third item, for example, the pickle, which in the example shown is 1.5 seconds. The process 800 continues via connector "B" to FIG. 9. The process flow in FIG. 9 is represented by reference numeral 900. The process 900 begins at block 902, including one or more operations for initiating the time allotted or cutting of the $3^{rd}$ item, for example, the pickle, which time is 5.5 seconds in the illustrated embodiment. The process 900 proceeds to the next block 904, including one or more operations for initiating the time period to facilitate dropping the pickle onto the tray. In the illustrated time, the time period is two seconds. The process 900 proceeds to the next block 906, including one or more operations for initiating the time period for the other items to drop on the tray, which in this embodiment is one second. The process 900 proceeds to the next block 908, including one or more operations for unlocking the tray, which in this instance is five seconds. The process 900 proceeds to the next block 910, including one or more operations for transitioning on the conveyor 109 to the fluid dispensing station or sub-system (fluid dispensing module 126), which in this instance takes 7.5 seconds. The process 900 proceeds to the next block 912, including one or more operations for rotating the fluid dispenser cover out (or off each mechanical dispensing structure). The time period designated for this operation is one second. The process 900 proceeds to the next block 914, including one or more operations for commencing the fluid dispensing sequence, which is designated to last for six seconds. The process 900 proceeds to the next block 916, including one or more operations for rotating the fluid dispensing cover in (on back on the dispensing mechanical structure), which operation is scheduled to last for one second. The process 900 proceeds to the next block 918, including one or more operations for unlocking the tray, which operation is designated a time period of five seconds. The process 900 proceeds to the next block 920, including one or more operations for transitioning to the next phase and operations, which in the illustrated embodiment is a frying station or sub-system. The transit time allotted for this transfer is five seconds. The process 900 proceeds to the next block 922, including one or more operations for loading the frying station or sub-system (507 in FIG. 5) with the food item for frying. In the illustrated embodiment, the fries are loaded for frying. The frying action is allotted a time slot of ten seconds. The process 900 proceeds to the next block 924, including one or more operations for initiating the next action of loading the lid back on the frying station or sub-system 507 (FIG. 5). This operation in designated a time slot of seven seconds. The process 900 flows to the next block 926, including one or more operations for, transiting to the output line, a loading action that is assigned two seconds.

Figure 10:
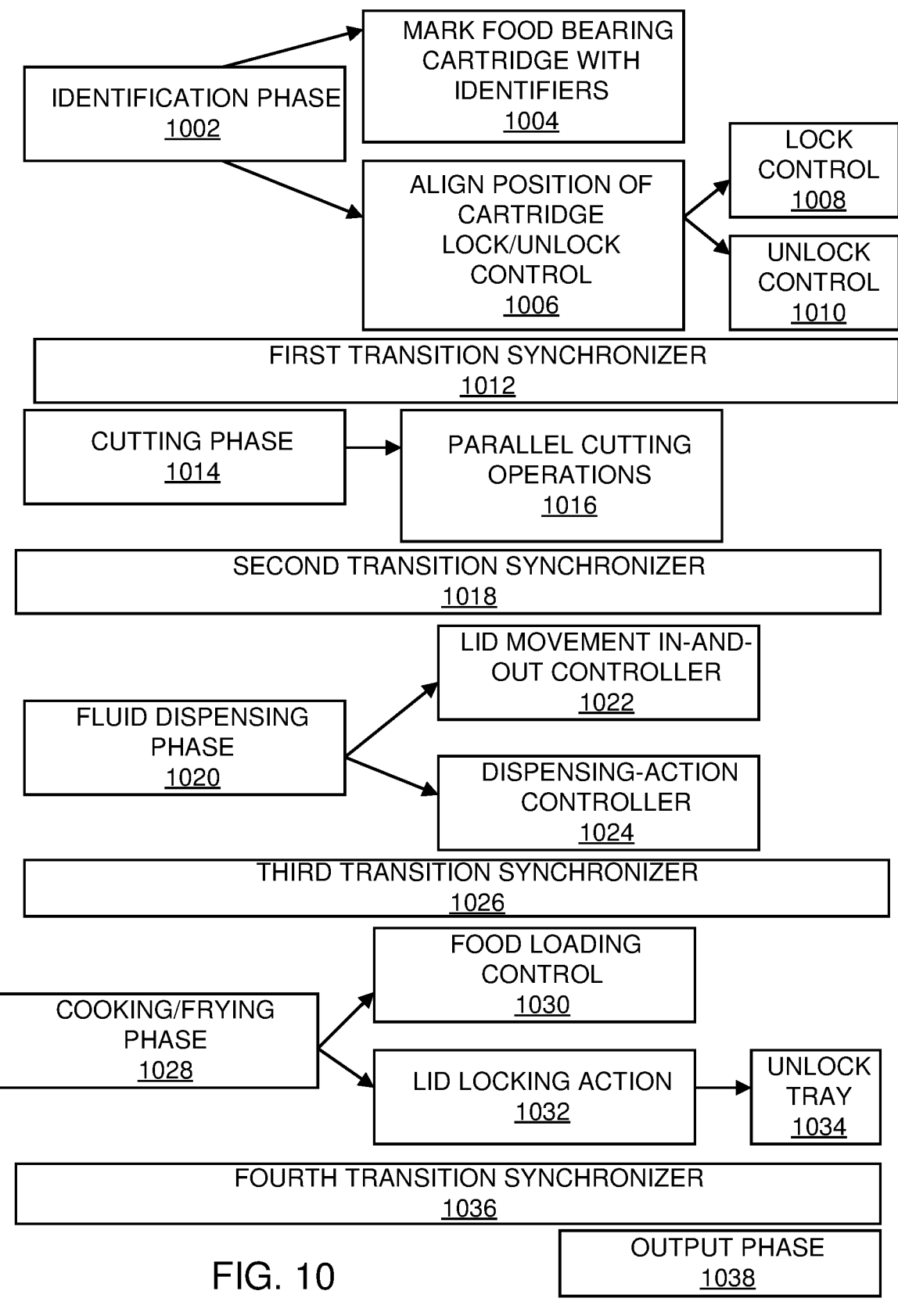
FIG. 10 is a block diagram illustrating the synchronized transitions between each phase in the automated food preparation process in accordance with the present invention.

Referring now to FIG. 10, the various phases in the automated food preparation sequencing is illustrated and described. The initial phase is the identification phase 1002, which comprises a plurality of operations to identify the products require to assemble the prepared food and/or the food prepared with the packaging used to present the items to consumers. In the illustrated embodiment, each of the trays or any other food bearing cartridges that may be used are marked with identifiers. As described above, in the illustrated embodiment bar codes are used to identify each tray. In this phase of operation, the cartridge is aligned in position on the conveyor 109, by a locking/unlocking control 1006. The locking/unlocking control 1006 comprises a lock control 1008 and a unlock control 1010, each of which is used to either lock the food bearing cartridge (e.g., tray) in position or to unlock it from its static position. The identification phase 1002 is followed by a first transition phase, which is controlled by a first transition synchronizer 1012. This phase is the time allotted to set up the next phase in the automated food preparation process. The next phase in the illustrated embodiment is the cutting phase 1014, during which any number of vegetables required may be cut or sliced as desired or required for preparing a particular finished food product. The cutting phase 1014 includes parallel cutting operations 1016 performed by cutting or slicing mechanical structures. This phase is followed by a second transition synchronizing phase performed by a second transition synchronizer 1018. The period set for transition is followed by the fluid dispensing phase 1020 including a first operation, during which a lid-movement in-and-out controller 1022 controls the actions of removing and placing the lid in place. It should be recognized that in the illustrated embodiment, four different fluid dispensing structures are illustrated. There may be any number of fluid dispensing structures used, for example, two in the instance that only two choices are preferred to ten or more, depending upon the options that are offered in each different commercial facility. In a second action in this phase, the dispensing action controller 1024 is activated to dispense the fluid indicated, either by preference of a particular consumer or as programmed to follow a particular recipe, instructions of the chef, or the like. The third phase in the automated food preparation process that is illustrated follows the second phase after a third period set for transition. This designated time is controlled by a third transition synchronizer 1026. This transition is before initiating the frying phase (or other cooking operation). This phase includes a food loading control action 1030 and a lid locking action 1032. The food loading control allows time for inserting the food item that requires frying into the fry station or sub-system, for example a batch of French fries to accompany an order for a hamburger. The lid locking action 1032 allows the food item to be cooked as desired, after which the next operation is to unlock the tray 1034. When this phase concludes, the fourth transition phase commences. The fourth transition synchronizer 1036 synchronizes the time allotted with the automated action. The final phase is the output phase 1038, at which point, the assembled item transitions on the conveyor 109 to be served to the consumer. This phase may include robotic arms that package the food item as desired. This action may be as simple as closing the lid of the box in which the hamburger was assembled.

Referring now to FIG. 11, the sensor arrays (116 in FIG. 1) and their actions through the automated food preparation sequence are described. The sensor array 1102 includes sensors one and two (in FIG. 2A) that are positioned to provide an input to the automated food preparation system 100 (FIG. 1), which reflects the presence of a food item. In other words, the sensor array 1102 is positioned as illustrated to sense the presence of the food item (1120). The sensors three and four (in FIG. 2A), collectively designated by reference numeral 1104, sense pre-loading the food item to the next station or sub-system position (e.g., a vegetable), as designated by reference numeral 1122. The sensors five and six 1106 (in FIG. 2A), are configured to provide an input or signal when the position of a food item is sensed or detected (1124). The sensor seven 1106 (in FIG. 2B) is configured to provide an input or signal when it senses a position of a food item (1124). The sensor eight 1110 (in FIG. 2B) is configured to sense the presence of a food item for starting a packing operation. The sensors nine 1112 (in FIG. 2C) are configured to sense an input or signal that a frying food item is present. To ensure that the food item that requires a frying or cooking operation is there before initiating unlocking of the lid. The sensors ten 1114 (in FIG. 2C) are configured to produce an output signal 1132 that the fried food item is without salt (e.g., no salt on an order of fries). Alternatively, sensors eleven 1116 (in FIG. 2C) are configured to produce an output signal that the fried food item is with salt (e.g., salt on an order of French fries). The sensors twelve 1118 (in FIG. 2B) produce an output signal that the food items are complete, as designated by reference numeral 1136.

In some embodiments, the sensors used in the automated food preparation system 100 (FIG. 1) may be proximity sensors. It will be recognized by those skilled in the art that several sensor technologies may be used to build proximity sensors, for example, ultrasonic sensors, capacitive, photoelectric, inductive, or magnetic sensors. In some embodiments, light sensors may be used. For example, a simple sensor that changes the voltage of Photovoltaic cells in concordance with the amount of light detected. A light sensor is best if the embodiments are created to track a line-marked path. Alternatively, in some embodiments, color sensors may be used, where different colors are reflected with different intensity. This simple sensor is in the same range with a light sensor, but with a few extra features that may be useful for applications where the device has to detect the presence of an object with a certain color. This type of sensor may be used to gauge the freshness of a particular vegetable. Alternatively, in some embodiments, a touch sensor may serve as a proximity sensor if it is designed to sense objects at a small distance with or without direct contact. This type of sensor may be designed to detect the changes in the capacitance between the on-board electrodes and the object making the contact. Alternatively, in some applications, an ultrasonic sensor may be used. These sensors are designed to generate high frequency sound waves and receive the echo reflected by the object. These sensors may be used in instances when it is not important to detect colors, surface texture, or transparency. In some other embodiments, motion detectors may be used to detecting approaching food items or the presence of a food item when it is aligned in a particular position. These types of sensors are based on infrared light, ultrasound, or microwave/radar technology. In certain embodiments, infrared sensors may be used, which are configured to measure the infrared ("IR") light that is transmitted in the environment, to find objects by an IR LED. This type of sensor is useful in applications that involve the need to avoid objects, measure precise distances, or follow a line. In large scale complex operations, a sonar sensor or a laser sensor may be used. A laser sensor is particularly useful for tracking and detecting an object located at a long distance. The distance between sensor and target is measured by calculating the speed of light and the time since light is emitted and until it is returned to the receiver. A laser sensor is very precise in measurement. In some applications, image sensors may be used, which are digital cameras, camera modules and other imaging devices based on CCD or CMOS technology. Each IOT sensor type has its characteristics that may improve the automated food preparation system 100 better for a certain task or replaceable for other tasks. For example, an ultrasonic sensor works well for solid objects but does not perform as well for soft or fuzzy objects. Also, some sensors are unable to figure the difference between a static object and a human being. All of these characteristics must be considered by those skilled in the art before use for particular automated food preparation applications.

In the above description, for purposes of explanation, numerous specific details are set forth in order to provide a thorough understanding this technology. It will be apparent, however, that this technology can be practiced without some of these specific details. In other instances, structures and devices are shown in block diagram form in order to avoid obscuring the innovative aspects. For example, the present technology is described in some implementations above with reference to particular hardware and software, yet it is not limited to only the particular hardware and software referenced.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The above description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three.

Also, wherever a component, an example of which is a module, of the present inventive technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative.

What is claimed is:

1. An automated food preparation system, comprising:
a plurality of trays, each identified by a unique identification code, and each tray carrying a unique order wherein each unique identification code allows each unique order to be processed non-sequentially;
at least two conveyors to convey the trays, to a plurality of stations associated with each conveyor, wherein the plurality of stations each comprise a mechanical structure to add a food component identified by the unique identification code to the unique order on each particular tray including at least a first station associated with each conveyor with a cutting module, the cutting module comprising a hopper for storing a vegetable and a cutting blade, and a second station associated with each conveyor with a fluid dispensing module;
a plurality of sensors positioned in relation to each station the plurality of sensors positioned to determine a presence of the unique order on each particular tray as it moves on one of the at least two conveyors past each particular sensor; and
an action controller coupled to the plurality of sensors which receives a first signal, indicating the presence of the unique order on each particular tray, at the first station and executes a first action by the cutting module, to slice the vegetable with the cutting module and position a sliced portion of the vegetable on the unique order with a single manipulator robot arm, the action controller receives a second signal, indicating the presence of the unique order on each particular tray, at the second station and executes a second action by the fluid dispensing module to dispense a sauce over the unique order, the action controller receives a third signal and executes a third action by adding a side order to each particular tray.

2. The system of claim 1, further comprising a dual manipulator robot arm which packages the unique order.

3. The system of claim 1, wherein the at least two conveyors are controlled by a motor.

4. The system of claim 1, wherein the at least two conveyors are a first conveyor for a first type of food preparation and further comprising a second conveyor for a second type of food preparation distinct from the first type of food preparation.

5. The system of claim 4, wherein the cutting module comprises a plurality of mechanical structures positioned over the first conveyor, the cutting module configured to slice a plurality of different vegetable items in response to the first signal or the second signal indicative that the particular tray is aligned with the mechanical structures.

6. The system of claim 5, wherein the plurality of mechanical structures comprises a predesignated number of mechanical structures constructed with a slicing mechanism configured to slice food items that are inserted into the mechanical structures, operations of each of the mechanical structures synchronized by the action controller.

7. The system of claim 1, further comprising a robotic mechanism coupled to the action controller, the robotic mechanism operable to perform an action on the unique order.

8. The system of claim 1, wherein the plurality of sensors comprises a first set of sensors operable in an identification phase of automated food preparation, a second set of sensors operable in a cutting phase of automated food preparation, a third set of sensors operable in a fluid dispensing phase of automated food preparation, and a fourth set of sensors operable in a cooking phase of automated food preparation.

9. The system of claim 1, wherein the action controller synchronizes actions in an automated food preparation phase, including an identification phase, a cutting phase, a fluid dispensing phase, a cooking phase.

10. The system of claim 9, wherein the action controller further synchronizes: 1) transition from the identification phase to the cutting phase by a first transition synchronizer routine, 2) transition from the cutting phase to the fluid dispensing phase by a second transition synchronizer routine, 3) transition from the fluid dispensing phase to the cooking phase by a third transition synchronizer routine, and 4) transition from the cooking phase to an output phase by a fourth transition synchronizer routine, wherein the output phase includes packaging of the unique order for delivery to consumers.

11. A method for automated food preparation, comprising:

identifying each of a plurality of trays with a unique identification code, and each tray carrying a unique order wherein each unique identification code allows each unique order to be processed non-sequentially;

providing at least two conveyors to convey the trays, to a plurality of stations associated with each conveyor, wherein the plurality of stations each comprise a mechanical structure to add a food component identified by the unique identification code to the unique order on each particular tray including at least a first station associated with each conveyor with a cutting module, the cutting module comprising a hopper for storing a vegetable and a cutting blade, and a second station associated with each conveyor with a fluid dispensing module;

positioning a plurality of sensors in relation to each station to determine a presence of the unique order on each particular tray as it moves on one of the at least two conveyors past each particular sensor; and coupling an action controller to the plurality of sensors and to receive a first signal, indicating the presence of the unique order on each particular tray, at the first station and executes a first action by the cutting module, to slice the vegetable with the cutting module and position a sliced portion of the vegetable on the unique order with a single manipulator robot arm, the action controller receives a second signal, indicating the presence of the unique order on each particular tray, at the second station and executes a second action by the fluid dispensing module to dispense a sauce over the unique order, the action controller receives a third signal and executes a third action by adding a side order to each particular tray.

12. The method of claim 11, wherein the plurality of sensors is coupled to a limit switch configured to determine when the particular tray passes the limit switch.

13. The method of claim 11, wherein the at least two conveyors are controlled by a motor.

14. The method of claim 11, wherein the at least two conveyors are a first conveyor for a first type of food preparation and further comprising a second conveyor for a second type of food preparation distinct from the first type of food preparation.

15. The method of claim 14, wherein the cutting module comprises a plurality of mechanical structures positioned over the first conveyor, the cutting module configured to slice a plurality of different vegetable items in response to the first signal or the second signal indicative that the particular tray is aligned with the mechanical structures.

16. The method of claim 15, wherein the plurality of mechanical structures comprises a predesignated number of mechanical structures constructed with a slicing mechanism configured to slice food items that are inserted into the mechanical structures, operations of each of the mechanical structures synchronized by the action controller.

17. The method of claim 11, further providing a robotic mechanism coupled to the action controller, the robotic mechanism operable to perform an action on the unique order.

18. The method of claim 11, wherein the plurality of sensors comprises a first set of sensors operable in an identification phase of automated food preparation, a second set of sensors operable in a cutting phase of automated food preparation, a third set of sensors operable in a fluid dispensing phase of automated food preparation, and a fourth set of sensors operable in a cooking phase of automated food preparation.

19. The method of claim 11, wherein the action controller synchronizes actions in an automated food preparation phase, including an identification phase, a cutting phase, a fluid dispensing phase, and a cooking phase.

20. The method of claim 19, wherein the action controller further synchronizes the following: 1) transition from the identification phase to the cutting phase by a first transition synchronizer routine, 2) transition from the cutting phase to the fluid dispensing phase by a second transition synchronizer routine, 3) transition from the fluid dispensing phase to the cooking phase by a third transition synchronizer routine, and 4) transition from the cooking phase to an output phase by a fourth transition synchronizer routine, wherein the output phase includes packaging of the unique order for delivery to consumers.

\* \* \* \* \*